US012726085B2

(12) United States Patent
Zhang et al.

(10) Patent No.: US 12,726,085 B2
(45) Date of Patent: Sep. 1, 2026

(54) MOTOR, ELECTRIC DRIVE DEVICE, ELECTRIC DRIVE SYSTEM, AND ELECTRIC APPARATUS

(71) Applicants: CONTEMPORARY AMPEREX INTELLIGENCE TECHNOLOGY (SHANGHAI) LIMITED, Shanghai (CN); CONTEMPORARY AMPEREX TECHNOLOGY CO., LIMITED, Ningde (CN)

(72) Inventors: Junhui Zhang, Shanghai (CN); Ji Xia, Shanghai (CN)

(73) Assignees: CONTEMPORARY AMPEREX INTELLIGENCE TECHNOLOGY (SHANGHAI) LIMITED, Shanghai (CN); CONTEMPORARY AMPEREX TECHNOLOGY CO., LIMITED, Ningde City (CN)

( * ) Notice: Subject to any disclaimer, the term of this patent is extended or adjusted under 35 U.S.C. 154(b) by 194 days.

(21) Appl. No.: 18/749,361

(22) Filed: Jun. 20, 2024

(65) Prior Publication Data

US 2024/0348129 A1 Oct. 17, 2024

Related U.S. Application Data

(63) Continuation of application No. PCT/CN2023/140776, filed on Dec. 21, 2023.

(30) Foreign Application Priority Data

Apr. 17, 2023 (CN) ......................... 202310412133.9
Nov. 16, 2023 (CN) ......................... 202311534393.X

(51) Int. Cl.
*H02K 9/197* (2006.01)
*B60K 11/02* (2006.01)
(Continued)

(52) U.S. Cl.
CPC ............. *H02K 9/197* (2013.01); *H02K 5/203* (2021.01); *H02K 7/003* (2013.01); *B60K 11/02* (2013.01)

(58) Field of Classification Search
CPC ........ H02K 9/197; H02K 5/203; H02K 7/003; H02K 9/19; B60K 11/02
(Continued)

(56) References Cited

U.S. PATENT DOCUMENTS 10,224,786 B2 3/2019 Woolmer et al.
2020/0274410 A1* 8/2020 Yao .......................... H02K 1/32
2021/0351658 A1* 11/2021 Jore ....................... H02K 5/203

FOREIGN PATENT DOCUMENTS

CN 102365810 A 2/2012
CN 102624121 A 8/2012
(Continued)

OTHER PUBLICATIONS

International Search Report dated Mar. 26, 2024 for Application No. PCT/CN2023/140776.

(Continued)

*Primary Examiner* — Ahmed Elnakib
(74) *Attorney, Agent, or Firm* — Ladas & Parry, LLP

(57) ABSTRACT

Disclosed are a motor, an electric drive device, an electric drive system, and an electric apparatus. The motor includes a casing and a stator. The casing has a first accommodation cavity configured to accommodate a cooling medium. The stator is disposed in the first accommodation cavity. At least part of the stator is immersed in the cooling medium.

14 Claims, 14 Drawing Sheets

(51) Int. Cl.
*H02K 5/20* (2006.01)
*H02K 7/00* (2006.01)

(58) Field of Classification Search
USPC .......................................................... 310/54
See application file for complete search history.

(56) References Cited

FOREIGN PATENT DOCUMENTS

| | | | |
|---|---|---|---|
| CN | 113037040 | A | 6/2021 |
| CN | 114977620 | A | 8/2022 |
| DE | 102014205034 | A1 | 9/2015 |
| JP | 2005224000 | A | 8/2005 |
| JP | 2005318782 | A | 11/2005 |
| KR | 20230012393 | A | 1/2023 |
| WO | 2010092402 | A1 | 8/2010 |

OTHER PUBLICATIONS

Written Opinion dated Mar. 26, 2024 for Application No. PCT/CN2023/140776.
Chinese Office Action dated Sep. 30, 2025 for application CN202311534393.X.
Extended European Search Report dated Apr. 7, 2025 for application EP 24172551.4.
Partial European Search Report for Application No. 24172551.4, mailed on Nov. 5, 2024, 23 pages.
Office action from corresponding European Patent Application No. 24172551.4 dated Feb. 19, 2026.
Office action from corresponding Chinese Patent Application No. CN202311534393.X dated Apr. 7, 2026.

* cited by examiner

MOTOR, ELECTRIC DRIVE DEVICE, ELECTRIC DRIVE SYSTEM, AND ELECTRIC APPARATUS

CROSS-REFERENCE TO RELATED APPLICATIONS

This application is a continuation of International application PCT/CN2023/140776 filed on Dec. 21, 2023 that claims priority to Chinese Patent Application No. 202310412133.9 filed on Apr. 17, 2023 and Chinese Patent Application No. 202311534393.X, filed on Nov. 16, 2023, the entire contents of which are incorporated herein by reference.

TECHNICAL FIELD

This application relates to the field of electric drive technologies, and more particularly, to a motor, an electric drive device, an electric drive system, and an electric apparatus.

BACKGROUND

A motor is a power device for converting electrical energy into mechanical energy. During an operation of the motor, current flows through a stator winding of the motor, causing the stator winding to generate heat. To prevent the motor from being damaged by overheating, the stator generally needs to be cooled. However, in the related art, a cooling method adopted for the motor is inefficient, which is not conducive to improving performance of the motor.

SUMMARY

An object of embodiments of this application is to provide a motor, an electric drive device, an electric drive system, and an electric apparatus, to solve a technical problem in the related art of a low cooling efficiency of a motor.

To achieve the above-mentioned object, a technical solution adopted by an embodiment of this application is to provide a motor including:

- a casing provided with a first accommodation cavity inside, where the first accommodation cavity is configured to accommodate a cooling medium; and
- a stator disposed in the first accommodation cavity, at least part of the stator being immersed in the cooling medium.

The motor provided by the embodiments of this application can at least provide the following advantageous effects. In the motor provided in the embodiments of this application, the first accommodation cavity formed in the casing is configured to accommodate the cooling medium, and the stator is disposed in the first accommodation cavity, so that the at least part of the stator is immersed in the cooling medium, and the cooling medium can be in direct contact with the stator. Therefore, heat generated by the stator can be effectively absorbed, which in turn effectively improves a cooling efficiency of the motor.

In some embodiments of this application, the motor further includes a rotor, a second accommodation cavity spaced apart from the first accommodation cavity is further provided inside the casing, and the rotor is disposed within the second accommodation cavity.

With the above-mentioned technical solution, the rotor can be isolated from the cooling medium in the first accommodation cavity to avoid a situation where the rotor is immersed in the cooling medium. Therefore, a rotational loss of the rotor can be effectively reduced, thereby effectively improving an operation efficiency of the motor.

In some embodiments of this application, the rotor includes a rotor shaft and a rotor disk connected to the rotor shaft, the rotor shaft is provided with a first cooling flow channel inside, and the first cooling flow channel being in communication with the first accommodation cavity.

With the above-mentioned technical solution, the cooling medium can flow between the first accommodation cavity and the first cooling flow channel to absorb the heat generated by the stator and heat generated by the rotor shaft sequentially. In this way, not only the stator is cooled, but also the rotor is effectively cooled without the rotor disk being immersed in the cooling medium. Therefore, both the cooling efficiency and the operation efficiency of the motor are further improved.

In some embodiments of this application, the rotor disk is provided with a second cooling flow channel inside, the second cooling flow channel having an end in communication with the first cooling flow channel and another end in communication with the second accommodation cavity.

With the above-mentioned technical solution, the cooling medium can flow between the first accommodation cavity, the first cooling flow channel, and the second cooling flow channel to absorb the heat generated by the stator, the heat generated by the rotor shaft, and heat generated by the rotor disk sequentially. In this way, not only the stator is cooled, but also the entire rotor is cooled. Therefore, the cooling efficiency of the motor is further improved.

In some embodiments of this application, an end of the second cooling flow channel away from the first cooling flow channel penetrates an end face of the rotor disk to be in communication with the second accommodation cavity.

With the above-mentioned technical solution, during a rotation of the rotor, the cooling medium will be thrown out, along the second cooling flow channel, into the second accommodation cavity via the end face of the rotor disk, which effectively prevents the cooling medium from flowing back to the second cooling flow channel under an action of gravity. Therefore, a circulation efficiency of the cooling medium is effectively improved, which in turn further improves the cooling efficiency of the motor.

In some embodiments of this application, the end of the second cooling flow channel away from the first cooling flow channel penetrates two opposite end faces of the rotor disk.

With the above-mentioned technical solution, the circulation efficiency of the cooling medium is further improved, which in turn further improves the cooling efficiency of the motor.

In some embodiments of this application, a plurality of second cooling flow channels are provided, and the plurality of second cooling flow channels are arranged around the rotor shaft.

With the above-mentioned technical solution, a cooling area of the rotor disk is effectively increased. Therefore, the cooling efficiency of the rotor is further improved, which in turn further improves the cooling efficiency of the motor.

In some embodiments of this application, a wall body of the rotor shaft is provided with a first through hole, the second cooling flow channel being in communication with the first cooling flow channel through the first through hole.

With the above-mentioned technical solution, a flow of the cooling medium between the first cooling flow channel and the second cooling flow channel is effectively realized.

In some embodiments of this application, a cavity wall of the second accommodation cavity is provided with a second through hole.

With the above-mentioned technical solution, the cooling medium in the second accommodation cavity can be effectively discharged outwards to avoid the situation where the rotor is immersed in the cooling medium. Therefore, the rotational loss of the rotor can be effectively reduced to effectively improve the operation efficiency of the motor.

In some embodiments of this application, the second through hole is formed at the peripheral wall of the second accommodation cavity.

With the above-mentioned technical solution, during the rotation of the rotor, the cooling medium will be thrown to the peripheral wall of the second accommodation cavity along the second cooling flow channel under an action of a centrifugal force and discharged out of the second accommodation cavity through the second through hole, which effectively improves a discharging efficiency of the cooling medium, further avoiding the situation where the rotor is immersed in the cooling medium. Therefore, the rotational loss of the rotor can be effectively reduced to effectively improve the operation efficiency of the motor.

In some embodiments of this application, a plurality of second through holes are provided, and the plurality of second through holes are arranged around the rotor shaft.

With the above-mentioned technical solution, the cooling medium can be discharged outwards more quickly, which further avoids the situation where the rotor is immersed in the cooling medium. Therefore, the rotational loss of the rotor can be effectively reduced to effectively improve the operation efficiency of the motor.

In some embodiments of this application, the first accommodation cavity includes a first cavity body and a second cavity body. The stator includes a first stator disposed in the first cavity body and a second stator disposed in the second cavity body. The second accommodation cavity is formed between the first cavity body and the second cavity body.

With the above-mentioned technical solution, the first stator and the second stator can be in direct contact with the cooling medium, in such a manner that the cooling medium can effectively absorb heat generated by the first stator and heat generated by the second stator. Therefore, the cooling efficiency of the dual-stator motor can be effectively improved.

In some embodiments of this application, the casing includes an outer casing, an inner casing, a first sealing assembly, and a second sealing assembly. The inner casing includes a first portion, a second portion, and a third portion disposed between the first portion and the second portion. The first cavity body is defined by the first portion, the first sealing assembly, and the outer casing. The second cavity body is defined by the second portion, the second sealing assembly, and the outer casing.

With the above-mentioned technical solution, the first cavity body and the second cavity body can be effectively formed.

In some embodiments of this application, the second accommodation cavity is formed in the third portion, or the second accommodation cavity is defined by the third portion, the first sealing assembly, the second sealing assembly, and the outer casing.

With the above-mentioned technical solution, the second accommodation cavity can be formed effectively and spaced apart from the first accommodation cavity.

In some embodiments of this application, the outer casing includes a first inner annular wall and a first outer annular wall surrounding the first inner annular wall.

The first portion includes a second inner annular wall and a second outer annular wall that are disposed between the first inner annular wall and the first outer annular wall, the second inner annular wall surrounding the first inner annular wall, and the second outer annular wall surrounding the second inner annular wall, and the first sealing assembly includes a first sealing member disposed between the first outer annular wall and the second outer annular wall and a second sealing member disposed between the first inner annular wall and the second inner annular wall; and/or the second portion includes a third inner annular wall and a third outer annular wall that are disposed between the first inner annular wall and the first outer annular wall, the third inner annular wall surrounding the first inner annular wall, and the third outer annular wall surrounding the third inner annular wall, and the second sealing assembly includes a third sealing member disposed between the first outer annular wall and the third outer annular wall and a fourth sealing member disposed between the first inner annular wall and the third inner annular wall.

With the above-mentioned technical solution, the first cavity body and the second cavity body can be effectively formed.

In some embodiments of this application, the first cavity body is in communication with the second cavity body.

With the above-mentioned technical solution, the cooling medium can flow between the first cavity body and the second cavity body, which effectively reduces a difference between an amount of cooling medium injected into the first cavity body and an amount of cooling medium injected into the second cavity body. Therefore, an overall heat distribution of the motor becomes balanced, which effectively improves operation performance of the motor.

In some embodiments of this application, the casing further has a communication channel spaced apart from the second accommodation cavity, the first cavity body being in communication with the second cavity body through the communication channel.

With the above-mentioned technical solution, the communication between the first cavity body and the second cavity body is effectively realized.

In some embodiments of this application, the second accommodation cavity includes a third cavity body and a fourth cavity body. The rotor includes a first rotor disposed in the third cavity body and a second rotor disposed in the fourth cavity body. The first accommodation cavity is formed between the third cavity body and the fourth cavity body.

With the above-mentioned technical solution, the stator can be in direct contact with the cooling medium, in such a manner that the cooling medium can effectively absorb the heat generated by the stator. Therefore, the cooling efficiency of the dual-rotor motor can be effectively improved.

In some embodiments of this application, the casing includes an outer casing, an inner casing, a first sealing assembly, and a second sealing assembly. The inner casing includes a first portion, a second portion, and a third portion disposed between the first portion and the second portion. The first accommodation cavity is defined by the third portion, the first sealing assembly, the second sealing assembly, and the outer casing.

With the above-mentioned technical solution, the first accommodation cavity can be effectively formed.

In some embodiments of this application, the third cavity body is formed in the first portion, or the third cavity body is defined by the first portion, the first sealing assembly, and the outer casing.

With the above-mentioned technical solution, the third cavity body can be formed effectively and spaced apart from the first accommodation cavity.

In some embodiments of this application, the fourth cavity body is formed in the second portion, or the fourth cavity body is defined by the second portion, the second sealing assembly, and the outer casing.

With the above-mentioned technical solution, the fourth cavity body can be formed effectively and spaced apart from the first accommodation cavity.

In some embodiments of this application, the outer casing includes a first inner annular wall and a first outer annular wall surrounding the first inner annular wall. The first sealing assembly includes a first sealing member disposed between the first outer annular wall and a side of the third portion in an axial direction of the motor. The second sealing assembly includes a third sealing member disposed between the first outer annular wall and another side of the third portion in the axial direction of the motor.

With the above-mentioned technical solution, the first accommodation cavity can be effectively formed.

In some embodiments of this application, the casing includes an outer casing and an inner casing disposed in the outer casing, the first accommodation cavity and the second accommodation cavity being formed in the inner casing.

With the above-mentioned technical solution, the first accommodation cavity and the second accommodation cavity can be formed effectively and spaced apart from each other.

In some embodiments of this application, the inner casing includes a casing body and a partition, the partition being disposed in the casing body to partition an internal space of the casing body into the first accommodation cavity and the second accommodation cavity.

With the above-mentioned technical solution, the first accommodation cavity and the second accommodation cavity can be effectively spaced apart from each other.

In some embodiments of this application, the casing has a cooling medium inlet and a cooling medium outlet that are respectively in communication with the first accommodation cavity, the cooling medium inlet including a first inlet located at an inner peripheral side of the stator, and the cooling medium outlet being located at an outer peripheral side of the stator.

With the above-mentioned technical solution, the cooling medium can enter an inner space of the stator through the first inlet, and then flow from the inner peripheral side of the stator to the outer peripheral side of the stator through gaps of the stator. Then, the cooling medium can be discharged out of the casing through the cooling medium outlet. In this way, the cooling medium can be in sufficient contact with the stator. Therefore, the heat generated by the stator can be absorbed more effectively, which in turn further improves the cooling efficiency of the motor.

In some embodiments of this application, the cooling medium inlet further includes a second inlet in communication with the first accommodation cavity, the second inlet being located at the outer peripheral side of the stator.

With the above-mentioned technical solution, the cooling medium can not only enter the inner space of the stator through the first inlet, but also enter an outer space of the stator through the second inlet, in such a manner that the cooling medium can be in more sufficient contact with the stator. Therefore, the heat generated by the stator can be absorbed more effectively, which in turn further improves the cooling efficiency of the motor.

In some embodiments of this application, the second inlet and the cooling medium outlet are formed at two opposite sides of the stator in a radial direction, respectively.

With the above-mentioned technical solution, after entering the outer space of the stator from the second inlet, the cooling medium can flow, in an outer peripheral direction of the stator, from a side of the stator in the radial direction to another side of the stator in the same radial direction, and be finally discharged out of the casing from the cooling medium outlet. In this way, the cooling medium can be in more sufficient contact with the stator. Therefore, the heat generated by the stator can be absorbed more effectively, which in turn further improves the cooling efficiency of the motor.

In some embodiments of this application, the motor further includes a rotor. A second accommodation cavity spaced apart from the first accommodation cavity is further provided inside the casing, and the rotor is disposed in the second accommodation cavity. The first accommodation cavity includes a first cavity body and a second cavity body. The stator includes a first stator disposed in the first cavity body and a second stator disposed in the second cavity body. The second accommodation cavity is formed between the first cavity body and the second cavity body.

With the above-mentioned technical solution, the cooling efficiency of the dual-stator, single-rotor motor can be effectively improved.

In some embodiments of this application, a plurality of first inlets are provided, at least one of the plurality of first inlets being located at a side of the first stator facing away from the rotor and in communication with the first cavity body, and at least one of the remaining of the plurality of first inlets being located at a side of the second stator facing away from the rotor and in communication with the second cavity body.

With the above-mentioned technical solution, part of the cooling medium can enter an inner space of the first stator through a corresponding one of the plurality of first inlets. Then, this part of the cooling medium can flow from an inner peripheral side of the first stator to an outer peripheral side of the first stator through gaps of the first stator. Similarly, another part of the cooling medium can enter an inner space of the second stator through a corresponding one of the plurality of first inlets, and then flow from an inner peripheral side of the second stator to an outer peripheral side of the second stator through gaps of the second stator. Then, the cooling medium can be discharged out of the casing through the cooling medium outlet. In this way, the cooling medium can be in more sufficient contact with not only the first stator but also the second stator. Therefore, the heat generated by the first stator and the heat generated by the second stator can be more effectively absorbed, which in turn further improves the cooling efficiency of the motor.

In some embodiments of this application, a plurality of second inlets are provided, at least one of the plurality of second inlets being in communication with the first cavity body, and at least one of the remaining of the plurality of second inlets being in communication with the second cavity body.

With the above-mentioned technical solution, part of the cooling medium can enter an outer space of the first stator through a corresponding one of the plurality of second inlets. Another part of the cooling medium can enter an outer space of the second stator through a corresponding one of the plurality of second inlets. Then, the cooling medium can be discharged out of the casing through the cooling medium outlet. In this way, the cooling medium can be in more sufficient contact with the first stator and the second stator. Therefore, the heat generated by the first stator and the heat generated by the second stator can be more effectively absorbed, which in turn further improves the cooling efficiency of the motor.

In some embodiments of this application, the first inlet is located at a side of the stator facing away from the rotor.

With the above-mentioned technical solution, formation of the first inlet at the casing can be facilitated.

In some embodiments of this application, the first inlet is opened in a direction parallel to an axial direction of the rotor.

With the above-mentioned technical solution, a flow speed of the cooling medium in the stator can be effectively improved to effectively improve a convective heat transfer coefficient between the cooling medium and the stator. Therefore, the cooling medium can more effectively absorb the heat generated by the stator, which in turn further improves the cooling efficiency of the motor.

In some embodiments of this application, the stator includes an iron core and a winding, the iron core having a wire winding groove extending through an inner peripheral side of the iron core and an outer peripheral side of the iron core, and the winding being disposed at the wire winding groove in a winding manner. The cooling medium flows from the first inlet to the cooling medium outlet through the wire winding groove.

With the above-mentioned technical solution, a flow of the cooling medium from an inner side of the stator to an outer side of the stator can be facilitated to enable the cooling medium to be in more sufficient contact with the stator. Therefore, the heat generated by the stator can be absorbed more effectively, which in turn further improves the cooling efficiency of the motor.

In some embodiments of this application, the casing has a cooling medium inlet and a cooling medium outlet that are respectively in communication with the first accommodation cavity, the cooling medium inlet being located at a height smaller than a height of the cooling medium outlet.

With the above-mentioned technical solution, the cooling medium can flow into the first accommodation cavity from a lower position of the casing and flow out of the first accommodation cavity from a higher position of the casing. In this way, a gas inside the first accommodation cavity can be effectively discharged outwards to effectively avoid a phenomenon of air entrapment of the cooling medium. Therefore, the cooling efficiency of the motor is further improved.

In some embodiments of this application, the cooling medium inlet is formed at a bottom of the casing. The cooling medium outlet is formed at a top of the casing.

With the above-mentioned technical solution, the phenomenon of air entrapment of the cooling medium can be further avoided, which in turn further improves the cooling efficiency of the motor.

The embodiments of this application further provide an electric drive device. The electric drive device includes a liquid supply mechanism and the motor according to any of the above-mentioned embodiments. The liquid supply mechanism is in communication with the first accommodation cavity to deliver the cooling medium into the first accommodation cavity.

The electric drive device provided by the embodiments of this application can at least provide the following advantageous effects. Since the motor according to any of the above-mentioned embodiments is adopted by the electric drive device provided by the embodiments of this application, a cooling efficiency of the electric drive device can be effectively improved, which is conducive to improving operation performance of the electric drive device.

In some embodiments of this application, the liquid supply mechanism includes a liquid inlet pipeline and a one-way valve. The liquid inlet pipeline is in communication with the first accommodation cavity. The one-way valve is disposed at the liquid inlet pipeline, to allow the cooling medium to flow from the liquid inlet pipeline towards the first accommodation cavity.

With the above-mentioned technical solution, a situation of reflux of the cooling medium that occurs after the cooling medium enters the first accommodation cavity can be effectively avoided to ensure that the first accommodation cavity accommodates enough cooling medium. In this way, the stator can be fully immersed in the cooling medium, which in turn further improves the cooling efficiency of the motor.

In some embodiments of this application, the liquid supply mechanism includes a power pump, and the casing has a first mounting space, the power pump being mounted in the first mounting space;

the liquid supply mechanism includes a heat exchanger, and the casing has a second mounting space, the heat exchanger being mounted in the second mounting space; and/or the liquid supply mechanism includes a filter, and the casing has a third mounting space, the filter being mounted in the third mounting space.

With the above-mentioned technical solution, an integration degree of the motor can be effectively improved, which in turn effectively reduces a volume of the electric drive device.

The embodiments of this application further provide an electric drive device. The electric drive device includes a flow guide mechanism and the motor according to any one of the above-mentioned embodiments. The first accommodation cavity is in communication with the first cooling flow channel through the flow guide mechanism.

The electric drive device provided by the embodiments of this application can at least provide the following advantageous effects. Since the motor according to any of the above-mentioned embodiments is adopted by the electric drive device provided by the embodiments of this application, a cooling efficiency of the electric drive device can be effectively improved, which is conducive to improving operation performance of the electric drive device.

In some embodiments of this application, the flow guide mechanism includes a flow guide member having a flow guide channel, the first accommodation cavity being in communication with the first cooling flow channel through the flow guide channel.

With the above-mentioned technical solution, a flow of the cooling medium between the first accommodation cavity and the first cooling flow channel can be effectively realized. Therefore, the stator and the rotor can be cooled.

In some embodiments of this application, the flow guide member includes a flow guide body and an inserter connected to the flow guide body, the flow guide channel penetrating the flow guide body and the inserter, and the inserter being inserted into the first cooling flow channel.

With the above-mentioned technical solution, the cooling medium can be effectively injected into the first cooling flow channel. Therefore, reliability of cooling the rotor of the motor can be effectively improved.

In some embodiments of this application, the electric drive device further includes a variable speed mechanism. The flow guide mechanism further includes a flow diverter having a first flow diversion channel and a second flow diversion channel, an end of the first flow diversion channel and an end of the second flow diversion channel being in communication with the first accommodation cavity, another end of the first flow diversion channel being in communication with the flow guide channel, and another end of the second flow diversion channel being in communication with the variable speed mechanism.

With the above-mentioned technical solution, the cooling medium discharged from the first accommodation cavity can not only flow into the first cooling flow channel to cool the rotor, but also flow into the variable speed mechanism to cool and lubricate members in the variable speed mechanism. Therefore, the cooling medium can be fully utilized, which is conducive to improving the operation performance of the electric drive device.

In some embodiments of this application, the casing is provided with a first bearing seat, the first cooling flow channel being in communication with the first bearing seat.

With the above-mentioned technical solution, the cooling medium discharged from the first cooling flow channel can flow into the first bearing seat to cool and lubricate members in the first bearing seat. Therefore, the cooling medium can be fully utilized, which is conducive to improving the operation performance of the electric drive device.

In some embodiments of this application, the casing is provided with a flow guide passage, the flow guide passage having an end in communication with the first cooling flow channel and another end in communication with the first bearing seat.

With the above-mentioned technical solution, the first cooling flow channel can effectively communicate with the first bearing seat, and a structure of the motor is made compact. Therefore, the volume of the electric drive device can be effectively reduced.

In some embodiments of this application, the electric drive device further includes a variable speed mechanism including a rotary shaft rotatably mounted at the first bearing seat.

With the above-mentioned technical solution, the rotary shaft of the variable speed mechanism can be effectively cooled and lubricated.

In some embodiments of this application, the rotary shaft is a power output shaft.

With the above-mentioned technical solution, the power output shaft of the variable speed mechanism can be effectively cooled and lubricated.

The embodiments of this application further provide an electric drive system including a battery and the electric drive device according to any of the above-mentioned embodiments. The battery is electrically connected to the electric drive device.

The electric drive system provided by the embodiments of this application can at least provide the following advantageous effects. Since the electric drive device according to any of the above-mentioned embodiments is adopted by the electric drive system provided by the embodiments of this application, a cooling efficiency of the electric drive system can be effectively improved, which is conducive to improving operation performance of the electric drive system.

The embodiments of this application further provide an electric apparatus. The electric apparatus includes the above-mentioned electric drive system.

The electric apparatus provided by the embodiments of this application can at least provide the following advantageous effects. Since the electric drive system according to any of the above-mentioned embodiments is adopted by the electric apparatus provided by the embodiments of this application, a cooling efficiency of the electric apparatus can be effectively improved, which is conducive to improving operation performance of the electric apparatus.

BRIEF DESCRIPTION OF THE DRAWINGS

In order to clearly explain technical solutions according to embodiments of this application, drawings used in the embodiments or the description of the related art are briefly described below. Obviously, the drawings as described below are merely some embodiments of this application. Based on these drawings, other drawings can be obtained by those skilled in the art without creative effort.

Figure 1:
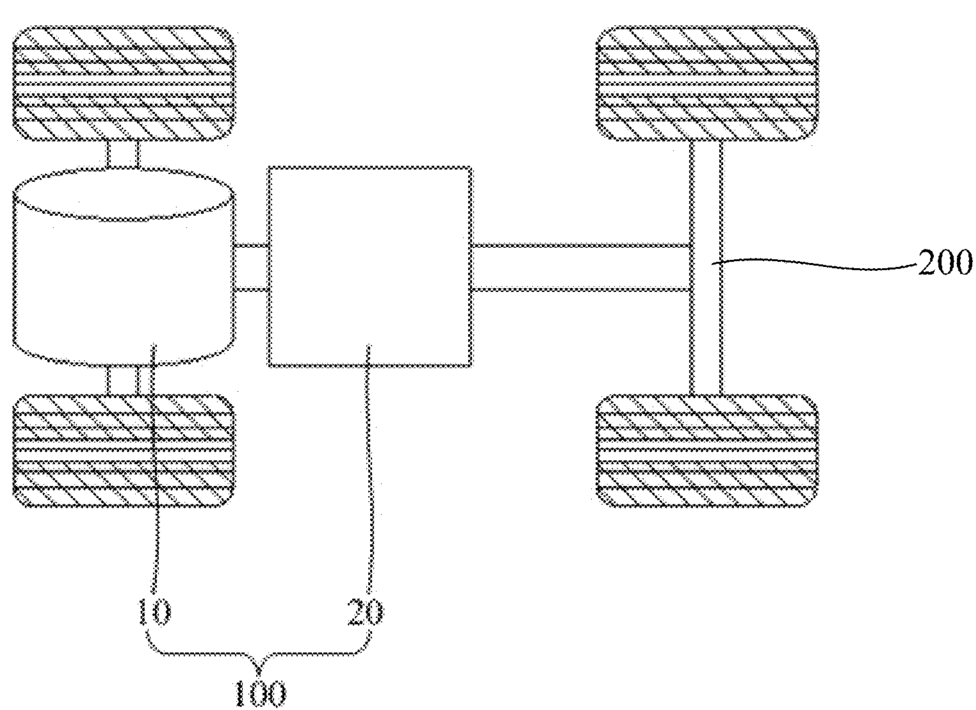
FIG. 1 is a schematic structural view of a vehicle according to an embodiment of this application.

Reference numerals of the accompanying drawings:

1000. vehicle;

100. electric drive system;

10. electric drive device;

11. motor; 111. casing; 1111. outer casing; 11111. first outer annular wall; 11112. first inner annular wall; 11113. first mounting space; 11114. second mounting space; 11115. third mounting space; 11116. first bearing seat; 11117. flow guide passage; 11118. second bearing seat; 1112. inner casing; 11121. partition; 11122. first portion; 11123. second portion; 11124. third portion; 11125. second outer annular wall; 11126. second inner annular wall; 11127. third outer annular wall; 11128. third inner annular wall; 1113. first accommodation cavity; 11131. first cavity body; 11132. second cavity body; 1114. second accommodation cavity; 11141. second through hole; 11142. third cavity body; 11143. fourth cavity body; 1115. first sealing assembly; 11151. first sealing member; 11152. second sealing member; 1116. second sealing assembly; 11161. third sealing member; 11162. fourth sealing member; 1117. communication channel; 1118. cooling medium inlet; 1118*a*. first inlet; 1118*b*. second inlet; 1119. cooling medium outlet; 112. stator; 112*a*. first stator; 112*b*. second stator; 1121. iron core; 11211. wire winding groove; 1122. winding; 113. rotor; 113*a*. first rotor; 113*b*. second rotor; 1131. rotor shaft; 11311. first cooling flow channel; 11312. first through hole; 1132. rotor disk; 11321. second cooling flow channel;

12. liquid supply mechanism; 121. power pump; 122. heat exchanger; 123. filter; 124. liquid inlet pipeline; 125. one-way valve;

13. flow guide mechanism; 131. flow guide member; 1311. flow guide channel; 1312. flow guide body; 1313. inserter; 132. flow diverter; 1321. first flow diversion channel; 1322. second flow diversion channel; 1323. flow collection channel;

14. variable speed mechanism;

20. battery;

21. battery housing; 211. first housing; 212. second housing;

22. battery cell;

200. vehicle body; and

300. cooling medium container.

DESCRIPTION OF EMBODIMENTS

In order to make technical problems to be solved by this application, technical solutions, and advantageous effects more apparent, this application will be described in detail with reference to the accompanying drawings and embodiments. It should be understood that the embodiments described here are only used to explain, rather than limit, this application.

It should be noted that, when an element is described as being "fixed to" or "disposed at" another element, it may be directly or indirectly at the other element. When an element is described as being "connected to" another element, it may be directly or indirectly connected to the other element.

It should be understood that the orientation or the position indicated by terms such as "length", "width", "upper", "lower", "front", "rear", "left", "right", "vertical", "horizontal", "top", "bottom", "inner", and "outer" should be construed to refer to the orientation or the position as shown in the drawings, and is only for the convenience of describing this application and simplifying the description, rather than indicating or implying that the pointed device or element must have a specific orientation, or be constructed and operated in a specific orientation, and therefore cannot be understood as a limitation of this application.

In addition, terms "first", "second", "third", and "fourth" are only used for descriptive purposes, and cannot be understood as indicating or implying relative importance or implicitly indicating the number of indicated technical features. Therefore, the features associated with "first", "second", "third", and "fourth" may explicitly or implicitly include at least one of the features. In the description of this application, "plurality" means at least two, unless otherwise specifically defined.

A motor, which is a power device of an electric apparatus, is configured to convert electrical energy into mechanical energy to drive the electric apparatus to operate. During an operation of the motor, current flows through a stator winding of the motor, in such a manner heat is generated by the stator winding. Therefore, to prevent the motor from being damaged by overheating, typically the stator needs to be cooled.

In the related art, a wall portion of a casing of the motor has a cooling flow channel for circulation of a cooling medium. During the operation of the motor, heat generated by the stator is transferred to the casing of the motor through air. With a continuous flow of the cooling medium in the cooling flow channel, heat of the casing is taken away for cooling the motor. However, since the heat generated by the stator needs to pass through the air and the casing of the motor sequentially before it is transferred to the cooling medium, a thermal transfer efficiency is low, in such a manner that the heat of the stator cannot be absorbed quickly by the cooling medium. Therefore, the motor has a low cooling efficiency, which is not conducive to improving performance of the motor.

To improve the cooling efficiency of the motor, a motor provided by the embodiments of this application has a first accommodation cavity formed in the casing. The first accommodation cavity is configured to accommodate a cooling medium. A stator is disposed in the first accommodation cavity to enable at least part of the stator to be immersed in the cooling medium, in such a manner that the cooling medium can be in direct contact with the stator. Therefore, the heat generated by the stator can be effectively absorbed, which in turn effectively improves the cooling efficiency of the motor.

The motor provided by the embodiments of this application can be applied in an electric apparatus. The electric apparatus may be, but is not limited to, a vehicle, a ship, an aircraft, a spacecraft, an excavator, a crane, a hoist, a lift, and the like. This is not specifically limited herein.

For ease of description of the following embodiments, as an example, the electric apparatus according to an embodiment of this application is described as a vehicle.

Referring to FIG. 1, FIG. 1 is a schematic structural view of a vehicle 1000 according to an embodiment of this application. Based on a power source, the vehicle 1000 may be a pure electric vehicle, a hybrid electric vehicle, a range-extended vehicle, or the like. Based on a drive manner, the vehicle 1000 may be a front-wheel drive vehicle, a rear-wheel drive vehicle, or a four-wheel drive vehicle. The vehicle 1000 includes a vehicle body 200 and an electric drive system 100.

As a main support component of the vehicle 1000, the vehicle body 200 has a cabin and a driver's compartment. The cabin is used to accommodate a power mechanism, an electronic control mechanism, a transmission mechanism, or the like of the vehicle 1000. The driver's compartment is used to provide an operation space and a riding space for a driver and a passenger. When the vehicle 1000 is a front-wheel drive vehicle, the cabin is disposed at a head of the vehicle body 200. In other words, the cabin is a front cabin. When the vehicle 1000 is a rear-wheel drive vehicle, the cabin is disposed at a tail of the vehicle body 200. In other words, the cabin is a rear cabin. When the vehicle 1000 is a four-wheel drive vehicle, the cabin includes a front cabin and a rear cabin. The front cabin is disposed at a head of the vehicle body 200. The rear cabin is disposed at a tail of the vehicle body 200. The driver's compartment is disposed between the head of the vehicle body 200 and the tail of the vehicle body 200.

The electric drive system 100 is a power system of the vehicle 1000, and is configured to convert electrical energy into mechanical energy and output the mechanical energy to a wheel of the vehicle 1000, to drive the vehicle 1000 to move. The electric drive system 100 is disposed at the vehicle body 200. Specifically, part of the electric drive system 100 may be disposed in the cabin, while another part of the electric drive system 100 may be disposed at a bottom of the vehicle body 200.

Referring to FIG. 1, the electric drive system 100 provided by an embodiment of this application includes a battery 20 and an electric drive device 10.

Figure 2:
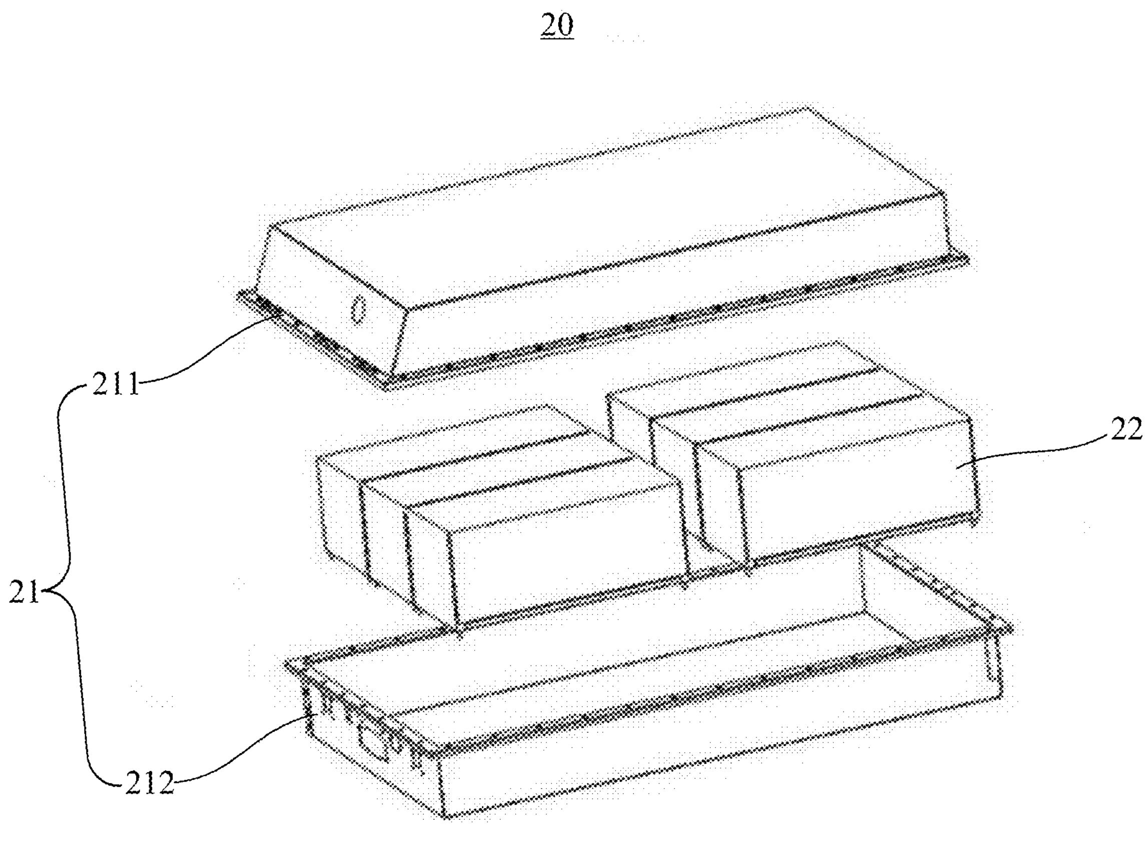
FIG. 2 is a schematic exploded structural view of a battery according to an embodiment of this application.

The battery 20 is configured to provide electrical energy for the electric drive device 10, and may be disposed at a bottom or a head or a tail of the vehicle 1000. Referring to FIG. 2, FIG. 2 is a schematic exploded structural view of the battery 20 according to an embodiment of this application. The battery 20 includes a battery housing 21 and a battery cell 22 accommodated in the battery housing 21. The battery housing 21 is configured to provide an accommodation space for the battery cell 22 and may be of various structures. In some embodiments, the battery housing 21 may include a first housing 211 and a second housing 212 that are capped on each other. An accommodation space for accommodating the battery cell 22 is defined by the first housing 211 and the second housing 212 together. The second housing 212 may have a hollow structure with an open end while the first housing 211 may have a plate-like structure. The first housing 211 is capped at an open side of the second housing 212 to define the accommodation space by the first housing 211 and the second housing 212 together. Each of the first housing 211 and the second housing 212 may also have a hollow structure with an open side. The open side of the first housing 211 is capped at the open side of the second housing 212. Certainly, the battery housing 21 formed by the first housing 211 and the second housing 212 may be of various shapes, such as a cylinder and a cuboid.

In some embodiments, the battery housing 21 may serve as part of a chassis structure of the vehicle 1000. For example, part of the battery housing 21 may serve as at least part of a floor of the vehicle 1000 or as at least part of a cross member and a longitudinal beam of the vehicle 1000.

In some embodiments, the battery 20 may include no battery housing 21. Instead, a plurality of battery cells 22 may be electrically connected to each other, form an entirety by means of a necessary fixation structure, and then be assembled into the vehicle 1000.

In the battery 20, a plurality of battery cells 22 may be provided. The plurality of battery cells 22 may be connected in series or in parallel or in series and parallel. The expression "in series and parallel" means that the plurality of battery cells 22 is connected both in series and in parallel. The plurality of battery cells 22 may be directly connected in series or in parallel or in series and parallel, and then accommodated in the battery housing 21 as a whole. Certainly, for the battery 20, the plurality of battery cells 22 may also be connected in series or in parallel or in series and parallel to form a battery module, and then a plurality of battery modules may be connected in series or in parallel or in series and parallel and accommodated in the battery housing 21 as a whole. The battery 20 may further include other functional components. For example, the battery 20 may further include a busbar configured to implement an electrical connection between the plurality of battery cells 22.

Each battery cell 22 may be a secondary battery or a primary battery. The secondary battery refers to a battery cell 22 that can be recharged to activate an active material for continued use after the battery cell 22 has been discharged. The primary battery refers to a battery cell 22 that cannot be recharged to activate the active material for continued use after the battery cell 22 has been depleted of electrical energy. The battery cell 22 may also be a lithium-ion battery, a sodium-ion battery, a sodium-lithium-ion battery, a lithium metal battery, a sodium metal battery, a lithium-sulfur battery, a magnesium-ion battery, a nickel-metal hydride battery, a nickel-cadmium battery, a lead-acid battery, or the like, but is not limited herein. The battery cell 22 may be a cylindrical battery cell, a prismatic battery cell, a soft package battery cell, or a battery cell of other shapes. The prismatic battery cell includes a square-case battery cell, a blade battery cell, and a multi-prismatic battery. The multi-prismatic battery is, for example, a hexagonal battery and is not specifically limited in this application.

The electric drive device 10 is configured to convert electrical energy provided by the battery 20 into mechanical energy and output the mechanical energy to the wheel of the vehicle 1000, for driving the vehicle 1000 to move. The electric drive device 10 is mounted in the cabin. Specifically, when the vehicle 1000 is the front-wheel drive vehicle, the electric drive device 10 is mounted in a front cabin and configured to output the above-mentioned mechanical energy to a front wheel of the vehicle 1000, for driving the vehicle 1000 to move. When the vehicle 1000 is the rear-wheel drive vehicle, the electric drive device 10 is mounted in the rear cabin and is configured to output the above-mentioned mechanical energy to a rear wheel of the vehicle 1000, for driving the vehicle 1000 to move. When the vehicle 1000 is the four-wheel drive vehicle, two electric drive devices 10 are provided. One of the two electric drive devices 10 is mounted in the front cabin and configured to output the above-mentioned mechanical energy to a front wheel of the vehicle 1000. The other one of the two electric drive devices 10 is mounted in the rear cabin and configured to output the above-mentioned mechanical energy to a rear wheel of the vehicle 1000, for driving the vehicle 1000 to move.

The electric drive device 10 includes a motor 11. The motor 11 is a main power output component of the electric drive device 10 and configured to convert the electrical energy provided by the battery 20 into the mechanical energy. The electric drive device 10 may further include a variable speed mechanism 14. The variable speed mechanism 14 is a power transmission mechanism of the electric drive device 10 and has a power input end and a power output end. The power input end of the variable speed mechanism 14 is connected to a rotary shaft of the motor 11, while the power output end of the variable speed mechanism 14 is connected to the wheel of the vehicle 1000, in such a manner that the above-mentioned mechanical energy is transferred to the wheel of the vehicle 1000 through varying a rotational speed and torque of the motor 11. The electric drive device 10 may further include a controller. The controller is configured to convert a direct current output from the battery 20 into an alternating current and deliver the alternating current to the motor 11. Further, the controller is configured to control an operation of the motor 11, for example, to control ON/OFF, the rotational speed, the torque, or the like of the motor 11.

The motor 11 provided in the embodiments of this application is described below in conjunction with the accompanying drawings.

Also referring to FIG. 3 to FIG. 9, an embodiment of this application provides the motor 11. The motor 11 includes a casing 111 and a stator 112. The casing 111 has a first accommodation cavity 1113. The first accommodation cavity 1113 is configured to accommodate a cooling medium. The stator 112 is disposed in the first accommodation cavity 1113. At least part of the stator 112 is immersed in the cooling medium.

The casing 111 is a component configured to provide an internal mounting environment for the motor 11. The first accommodation cavity 1113 is a part of the internal mounting environment of the motor 11. The stator 112 and the cooling medium are accommodated in the first accommodation cavity 1113. Optionally, the casing 111 may be an integral member or an assembled member assembled from a plurality of portions. The casing 111 may be made of, but is not limited to, copper, iron, aluminum, stainless steel, aluminum alloy, plastics, or the like. In some embodiments, when the casing 111 includes a plurality of portions, some portions of the casing 111 may be made of a metal such as copper, iron, aluminum, stainless steel, or aluminum alloy, and some other portions of the casing 111 may be made of plastic. This is not specifically limited herein.

The cooling medium is a medium for absorbing heat generated by the stator 112 and heat generated by other heat generation components, and may be statically accommodated in the first accommodation cavity 1113 or enter the first accommodation cavity 1113 during a circular flow. Optionally, the cooling medium may be, but is not limited to, cooling oil, cooling water, or the like. This is not specifically limited herein.

The stator 112 is a fixed portion of the motor 11 and is configured to drive a rotating portion of the motor 11 to rotate. The stator 112 may be partially or fully immersed in the cooling medium.

With the motor 11 provided in the embodiments of this application, the first accommodation cavity 1113 configured to accommodate the cooling medium is formed in the casing 111. The stator 112 is disposed in the first accommodation cavity 1113 to enable the at least part of the stator 112 to be immersed in the cooling medium, in such a manner that the cooling medium can be in direct contact with the stator 112. Therefore, the heat generated by the stator 112 can be effectively absorbed, which in turn effectively improves a cooling efficiency of the motor 11.

In some embodiments of this application, also referring to FIG. 5 to FIG. 9, the motor 11 further includes a rotor 113. A second accommodation cavity 1114 spaced apart from the first accommodation cavity 1113 is further provided inside the casing 111. The rotor 113 is disposed in the second accommodation cavity 1114.

The rotor 113 is a rotating portion of the motor 11.

The second accommodation cavity 1114 is a part of the internal mounting environment of the motor 11. The first accommodation cavity 1113 is spaced apart from the second accommodation cavity 1114, which means that the cooling medium in the first accommodation cavity 1113 is unable to directly enter the second accommodation cavity 1114. For example, a divider may be disposed in the casing 111 to divide at least part of an internal mounting space of the casing 111 into the above-mentioned first accommodation cavity 1113 and the above-mentioned second accommodation cavity 1114. In this embodiment, the first accommodation cavity 1113 and the second accommodation cavity 1114 are distributed in an axial direction of the motor 11. In other embodiments, the first accommodation cavity 1113 and the second accommodation cavity 1114 may also be distributed in a radial direction of the motor 11.

With the above-mentioned technical solution, the rotor 113 can be isolated from the cooling medium in the first accommodation cavity 1113 to avoid a situation where the rotor 113 is immersed in the cooling medium. Therefore, a rotational loss of the rotor 113 can be effectively reduced to effectively improve an operation efficiency of the motor 11.

In some embodiments of this application, also referring to FIG. 5 to FIG. 9, the rotor 113 includes a rotor shaft 1131 and a rotor disk 1132 connected to the rotor shaft 1131. The rotor shaft 1131 internally has a first cooling flow channel 11311. The first cooling flow channel 11311 is in communication with the first accommodation cavity 1113.

The rotor shaft 1131 is a component configured to transmit the above-mentioned mechanical energy outwards. The rotor disk 1132 is a component configured to interact with the stator 112 to generate an electromagnetic induction effect. With the electromagnetic induction effect, the rotor disk 1132 rotates with a central axis of the rotor shaft 1131 as a rotation axis. It should be understood that the rotor shaft 1131 is fixedly connected to a center of the rotor disk 1132.

The first cooling flow channel 11311 is configured to provide for the cooling medium a flow path in the rotor shaft 1131. In this embodiment, the first cooling flow channel 11311 extends in a direction parallel to the central axis of the rotor shaft 1131. In other embodiments, the first cooling flow channel 11311 may extend obliquely with respect to the central axis of the rotor shaft 1131, or may extend in a direction perpendicular to the central axis of the rotor shaft 1131, or may partially extend in the direction parallel to the central axis of the rotor shaft 1131 and partially extend obliquely with respect to the central axis of the rotor shaft 1131, or may partially extend in the direction parallel to the central axis of the rotor shaft 1131 and partially extend in the direction perpendicular to the central axis of the rotor shaft 1131. In some embodiments, the first cooling flow channel 11311 penetrates an end of the rotor shaft 1131. In some embodiments, the first cooling flow channel 11311 extends through two ends of the rotor shaft 1131.

The first cooling flow channel 11311 is in communication with the first accommodation cavity 1113, which means that at least part of the cooling medium in the first accommodation cavity 1113 may enter the first cooling flow channel 11311 through a necessary communication structure. The communication structure may be disposed in the casing 111. For example, a channel is formed in the casing 111 to communicate the first cooling flow channel 11311 and the first accommodation cavity 1113. The communication structure may also be disposed outside the casing 111. For example, a duct is disposed outside the casing 111 to communicate the first cooling flow channel 11311 and the first accommodation cavity 1113.

With the above-mentioned technical solution, the cooling medium can flow between the first accommodation cavity 1113 and the first cooling flow channel 11311 to absorb the heat generated by the stator 112 and heat generated by the rotor shaft 1131 sequentially. In this way, not only the stator 112 is cooled, but also the rotor 113 is effectively cooled without the rotor disk 1132 being immersed in the cooling medium. Therefore, both the cooling efficiency and the operation efficiency of the motor 11 are further improved.

In some embodiments of this application, also referring to FIG. 5 to FIG. 9, the rotor disk 1132 internally has a second cooling flow channel 11321. The second cooling flow channel 11321 has an end in communication with the first cooling flow channel 11311 and another end in communication with the second accommodation cavity 1114.

The second cooling flow channel 11321 is configured to provide for the cooling medium a flow path in the rotor disk 1132. In this embodiment, the second cooling flow channel 11321 extends in a direction parallel to a radial direction of the rotor disk 1132. In other embodiments, the second cooling flow channel 11321 may extend obliquely with respect to the radial direction of the rotor disk 1132, or may extend in a direction perpendicular to the radial direction of the rotor disk 1132, or may partially extend in the direction parallel to the radial direction of the rotor disk 1132 and partially extend obliquely with respect to the radial direction of the rotor disk 1132, or may partially extend in the direction parallel to the radial direction of the rotor disk 1132 and partially extend in the direction perpendicular to the radial direction of the rotor disk 1132.

The second cooling flow channel 11321 is in communication with the first cooling flow channel 11311, which means that at least part of the cooling medium in the first cooling flow channel 11311 may enter the second cooling flow channel 11321 through a necessary communication structure. The second cooling flow channel 11321 is in communication with the second accommodation cavity 1114, which means that at least part of the cooling medium in the second cooling flow channel 11321 may enter the second accommodation cavity 1114 through a necessary communication structure. In other words, at least part of the cooling medium in the first accommodation cavity 1113 may enter the second accommodation cavity 1114 through the first cooling flow channel 11311 and the second cooling flow channel 11321.

With the above-mentioned technical solution, the cooling medium can flow between the first accommodation cavity 1113 and the first cooling flow channel 11311, and between the first cooling flow channel 11311 and the second cooling flow channel 11321, so that the heat generated by the stator 112, the heat generated by the rotor shaft 1131, and heat generated by the rotor disk 1132 are absorbed sequentially. In this way, not only the stator 112 is cooled, but also the entire rotor 113 is cooled. Therefore, the cooling efficiency of the motor 11 is further improved.

In some embodiments of this application, also referring to FIG. 5 to FIG. 9, an end of the second cooling flow channel 11321 away from the first cooling flow channel 11311 penetrates an end face of the rotor disk 1132 to be in communication with the second accommodation cavity 1114.

The end face of the rotor disk 1132 means a face of the rotor disk 1132 distributed in an axial direction of the rotor shaft 1131. That end of the second cooling flow channel 11321 away from the first cooling flow channel 11311 penetrates the end face of the rotor disk 1132, which means that an end opening of the second cooling flow channel 11321 away from the first cooling flow channel 11311 is formed at the end face of rotor disk 1132.

It should be understood that, in a case where the axial direction of the motor 11 is parallel to the ground plane, if the end of the second cooling flow channel 11321 away from the first cooling flow channel 11311 penetrates an outer peripheral surface of the rotor disk 1132 to be in communication with the second accommodation cavity 1114, the cooling medium is thrown out from the second cooling flow channel 11321 to a peripheral wall of the second accommodation cavity 1114 during a rotation of the rotor disk 1132. Subsequently, the cooling medium is likely to fall under an action of gravity and re-enter the second cooling flow channel 11321, resulting in a phenomenon of the cooling medium flowing back to the second cooling flow channel 11321.

In contrast to the above situation, the end of the second cooling flow channel 11321 away from the first cooling flow channel 11311 penetrates the end face of the rotor disk 1132 to be in communication with the second accommodation cavity 1114. During a rotation of the rotor 113, the cooling medium will be thrown out, along the second cooling flow channel 11321, into the second accommodation cavity 1114 via the end face of the rotor disk 1132, which effectively prevents the cooling medium from flowing back to the second cooling flow channel 11321 under the action of gravity. Therefore, a circulation efficiency of the cooling medium is effectively improved, which in turn further improves the cooling efficiency of the motor 11.

In some embodiments of this application, also referring to FIG. 5 to FIG. 9, the end of the second cooling flow channel 11321 away from the first cooling flow channel 11311 penetrates two opposite end faces of the rotor disk 1132.

With the above-mentioned technical solution, the circulation efficiency of the cooling medium is further improved, which in turn further improves the cooling efficiency of the motor 11.

In other embodiments, the end of the second cooling flow channel 11321 away from the first cooling flow channel 11311 penetrates the outer peripheral surface of the rotor disk 1132.

In some embodiments of this application, a plurality of second cooling flow channels 11321 are provided, and the plurality of second cooling flow channels 11321 are arranged around the rotor shaft 1131.

In this embodiment, the plurality of second cooling flow channels 11321 is uniformly distributed around the rotor shaft 1131. In other embodiments, the plurality of second cooling flow channels 11321 is non-uniformly distributed around the rotor shaft 1131. It should be noted that a quantity of the second cooling flow channels 11321 may be set as desired. The quantity of the second cooling flow channels 11321 may specifically be two, three, four, five, or the like, and is not specifically limited herein.

With the above-mentioned technical solution, a cooling area of the rotor disk 1132 is effectively increased. Therefore, the cooling efficiency of the rotor 113 is further improved, which in turn further improves the cooling efficiency of the motor 11.

In some embodiments of this application, also referring to FIG. 5 to FIG. 9, a wall body of the rotor shaft 1131 has a first through hole 11312. The second cooling flow channel 11321 is in communication with the first cooling flow channel 11311 through the first through hole 11312.

The first through hole 11312 refers to a hole extending through both an inner side and an outer side of the wall body of the rotor shaft 1131. In a case where the plurality of second cooling flow channels 11321 are provided, a plurality of first through holes 11312 are also provided. The plurality of first through holes is arranged in a one-to-one correspondence with the plurality of second cooling flow channels 11321. Optionally, the first through hole 11312 may be in, but is not limited to, a circular shape, a square shape, a triangle shape, and the like. This is not specifically limited herein.

With the above-mentioned technical solution, a flow of the cooling medium between the first cooling flow channel 11311 and the second cooling flow channel 11321 is effectively realized.

In some embodiments of this application, also referring to FIG. 5 to FIG. 9, a cavity wall of the second accommodation cavity 1114 is provided with a second through hole 11141.

The second through hole 11141 is a hole allowing the second accommodation cavity 1114 to communicate with a space other than the first accommodation cavity 1113. In other words, the cooling medium in the second accommodation cavity 1114 may enter the space other than the first accommodation cavity 1113 through the second through hole 11141. Optionally, the second through hole 11141 may be in, but is not limited to, a circular shape, a square shape, a triangle shape, and the like. This is not specifically limited herein.

In some embodiments, the second through hole 11141 is in communication with a cooling medium container 300. In other words, the cooling medium is able to flow back into the cooling medium container 300 through the second through hole 11141 after flowing through the rotor 113.

With the above-mentioned technical solution, the cooling medium in the second accommodation cavity 1114 can be effectively discharged outwards to avoid the situation where the rotor 113 is immersed in the cooling medium. Therefore, the rotational loss of the rotor 113 can be effectively reduced to effectively improve the operation efficiency of the motor 11.

In some embodiments of this application, also referring to FIG. 5 to FIG. 9, the second through hole 11141 is formed at a peripheral wall of the second accommodation cavity 1114.

The above-mentioned peripheral wall refers to a wall surface surrounding the rotor shaft 1131.

With the above-mentioned technical solution, during the rotation of the rotor 113, the cooling medium will be thrown to the peripheral wall of the second accommodation cavity 1114 along the second cooling flow channel 11321 under an action of a centrifugal force and discharged out of the second accommodation cavity 1114 through the second through hole 11141, which effectively improves a discharging efficiency of the cooling medium, and avoids the situation where the rotor 113 is immersed in the cooling medium. Therefore, the rotational loss of the rotor 113 can be effectively reduced to effectively improve the operation efficiency of the motor 11.

In some embodiments of this application, also referring to FIG. 5 to FIG. 9, a plurality of second through holes 11141 are provided, and the plurality of second through holes 11141 are arranged around the rotor shaft 1131.

In this embodiment, the plurality of second through holes 11141 is uniformly distributed around the rotor shaft 1131. In other embodiments, the plurality of second through holes 11141 is non-uniformly distributed around the rotor shaft 1131. It should be noted that a quantity of the second through holes 11141 may be set as desired. The quantity of the second cooling flow channels 11321 may specifically be two, three, four, five, or the like, and is not specifically limited herein.

With the above-mentioned technical solution, the cooling medium can be discharged outwards more quickly, which further avoids the situation where the rotor 113 is immersed in the cooling medium. Therefore, the rotational loss of the rotor 113 can be effectively reduced to effectively improve the operation efficiency of the motor 11.

Figure 5:
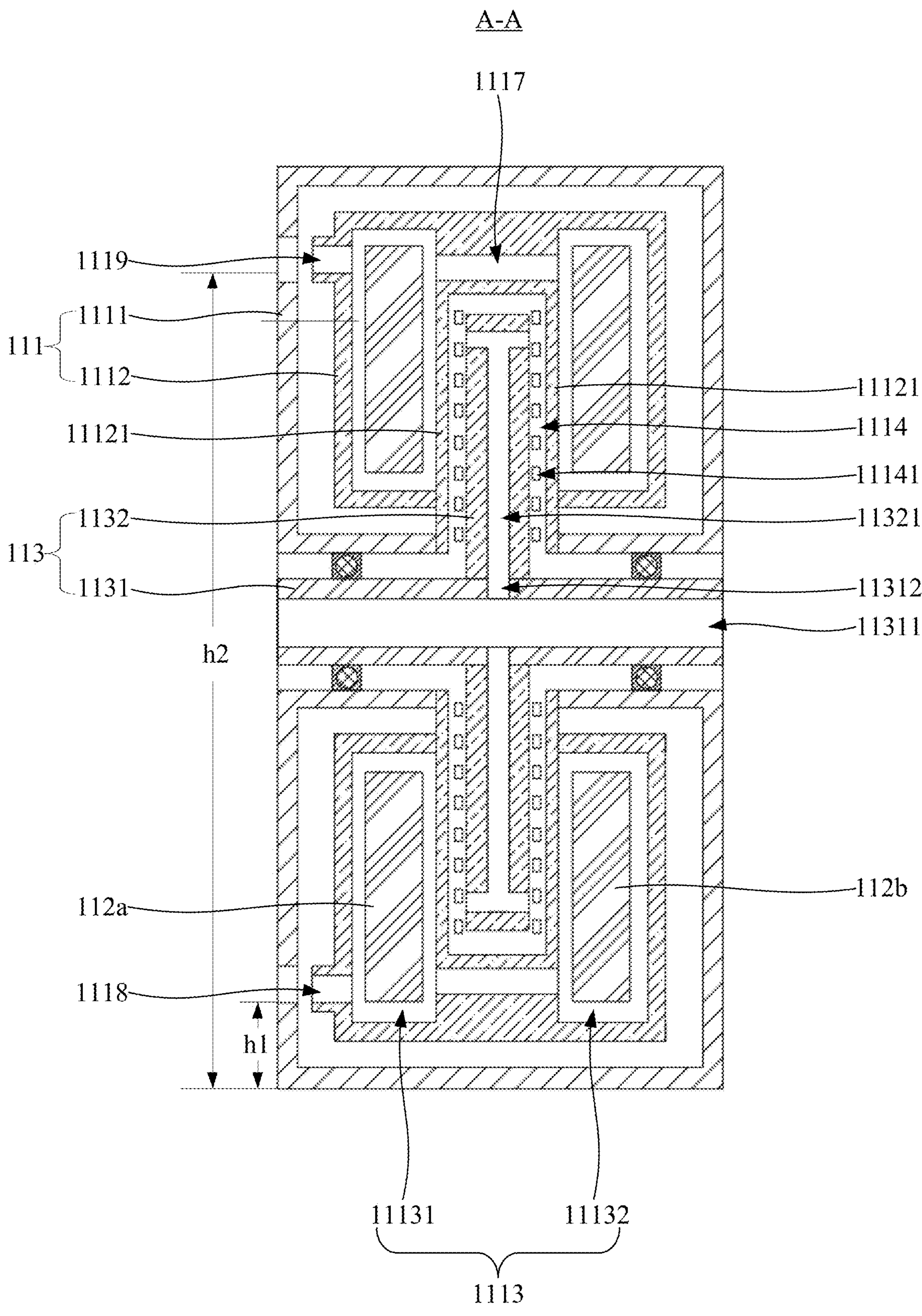
FIG. 5 is a first schematic cross-sectional structural view of a motor in the electric drive device along line A-A as illustrated in FIG. 4.
Figure 6:
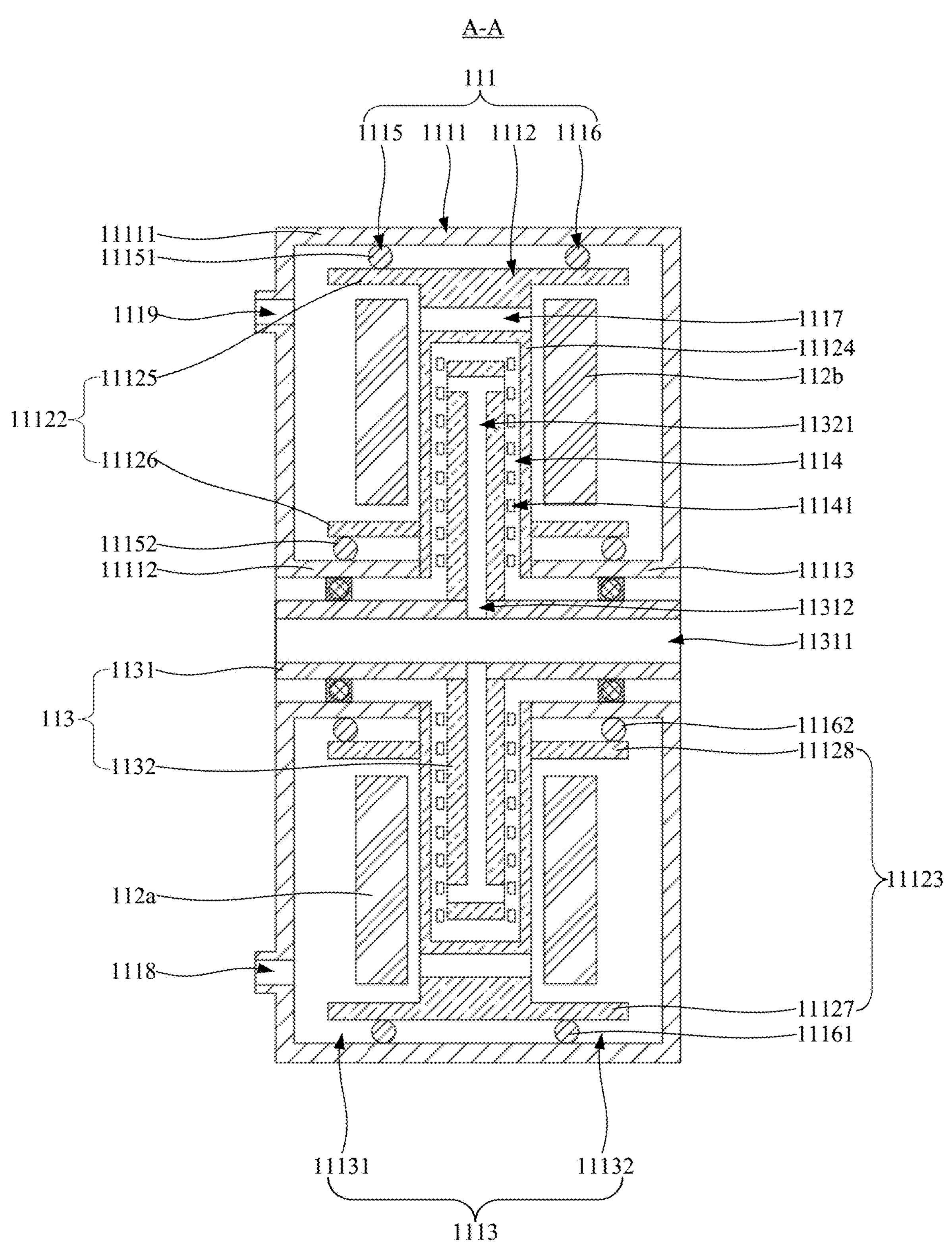
FIG. 6 is a second schematic cross-sectional structural view of a motor in the electric drive device along line A-A as illustrated in FIG. 4.

In some embodiments of this application, also referring to FIG. 5 and FIG. 6, the first accommodation cavity 1113 includes a first cavity body 11131 and a second cavity body 11132. The stator 112 includes a first stator 112*a* disposed in the first cavity body 11131 and a second stator 112*b* disposed in the second cavity body 11132. The second accommodation cavity 1114 is formed between the first cavity body 11131 and the second cavity body 11132.

The second accommodation cavity 1114 is formed between the first cavity body 11131 and the second cavity body 11132, which means that the rotor 113 is disposed between the first stator 112*a* and the second stator 112*b*. In other words, in this embodiment, the motor 11 is a dual-stator, single-rotor motor. The first cavity body 11131 is spaced apart from the second accommodation cavity 1114. The second cavity body 11132 is spaced apart from the second accommodation cavity 1114.

With the above-mentioned technical solution, the first stator 112*a* and the second stator 112*b* can be in direct contact with the cooling medium, in such a manner that the cooling medium can effectively absorb heat generated by the first stator 112*a* and heat generated by the second stator 112*b*. Therefore, the cooling efficiency of the dual-stator 112 motor 11 can be effectively improved.

In some embodiments of this application, referring to FIG. 6, the casing 111 includes an outer casing 1111, an inner casing 1112, a first sealing assembly 1115, and a second sealing assembly 1116. The inner casing 1112 includes a first portion 11122, a second portion 11123, and a third portion 11124 disposed between the first portion 11122 and the second portion 11123. The first cavity body 11131 is defined by the first portion 11122, the first sealing assembly 1115, and the outer casing 1111. The second cavity body 11132 is defined by the second portion 11123, the second sealing assembly 1116, and the outer casing 1111.

The first portion 11122, the third portion 11124, and the second portion 11123 of the inner casing 1112 are three portions of the inner casing 1112 distributed in the axial direction of the motor 11.

The first sealing assembly 1115 is an assembly for closing a gap between the first portion 11122 and an inner wall of the outer casing 1111, to prevent the cooling medium in the first cavity body 11131 from directly entering the second accommodation cavity 1114.

The second sealing assembly 1116 is an assembly for closing a gap between the second portion 11123 and the inner wall of the outer casing 1111, to prevent the cooling medium in the second cavity body 11132 from directly entering the second accommodation cavity 1114.

With the above-mentioned technical solution, the first cavity body 11131 and the second cavity body 11132 can be effectively formed.

In some embodiments of this application, referring to FIG. 6, the second accommodation cavity 1114 is formed in the third portion 11124, or the second accommodation cavity 1114 is defined by the third portion 11124, the first sealing assembly 1115, the second sealing assembly 1116, and the outer casing 1111.

In other words, the second accommodation cavity 1114 may be formed directly in the third portion 11124. For example, the third portion 11124 is integrally formed with the second accommodation cavity 1114 through an injection molding process. The second accommodation cavity 1114 may also be defined by the third portion 11124, the first sealing assembly 1115, the second sealing assembly 1116, and the outer casing 1111.

With the above-mentioned technical solution, the second accommodation cavity 1114 can be formed effectively, with the first accommodation cavity 1113 spaced apart from the second accommodation cavity 1114.

In some embodiments of this application, referring to FIG. 6, the outer casing 1111 includes a first inner annular wall 11112 and a first outer annular wall 11111 surrounding the first inner annular wall 11112. The first portion 11122 includes a second inner annular wall 11126 and a second outer annular wall 11125 that are disposed between the first inner annular wall 11112 and the first outer annular wall 11111. The second inner annular wall 11126 surrounds the first inner annular wall 11112. The second outer annular wall

11125 surrounds the second inner annular wall 11126. The first sealing assembly 1115 includes a first sealing member 11151 and a second sealing member 11152. The first sealing member 11151 is disposed between the first outer annular wall 11111 and the second outer annular wall 11125. The second sealing member 11152 is disposed between the first inner annular wall 11112 and the second inner annular wall 11126.

The first inner annular wall 11112 is configured to provide an outlet space for the rotor shaft 1131. In other words, at least part of the rotor shaft 1131 passes through an intra-annular space of the first inner annular wall 11112. The first outer annular wall 11111 surrounds the first inner annular wall 11112. In other words, the first inner annular wall 11112 is disposed in an intra-annular space of the first outer annular wall 11111. In some embodiments, the first inner annular wall 11112 has a bearing mounted in the intra-annular space of the first inner annular wall 11112. At least part of the rotor shaft 1131 is mounted in the bearing.

The second inner annular wall 11126 surrounds the first inner annular wall 11112. In other words, at least part of the first inner annular wall 11112 is disposed in an intra-annular space of the second inner annular wall 11126. The second outer annular wall 11125 surrounds the second inner annular wall 11126. In other words, the second inner annular wall 11126 is disposed in an intra-annular space of the second outer annular wall 11125. In general, the first inner annular wall 11112, the second inner annular wall 11126, the second outer annular wall 11125, and the first outer annular wall 11111 are sequentially arranged one inside another in the radial direction of the motor 11.

The first sealing member 11151 is a member for closing a gap between the first outer annular wall 11111 and the second outer annular wall 11125. The first sealing member 11151 may be made of, but is not limited to being made of, rubber, silicone, sealant, or the like, and is not specifically limited herein. In this embodiment, the first sealing member 11151 has an annular structure. The first sealing member 11151 is arranged around an outer peripheral side of the second outer annular wall 11125 and is located between and pressed against the first outer annular wall 11111 and the second outer annular wall 11125.

The second sealing member 11152 is a member for closing a gap between the first inner annular wall 11112 and the second inner annular wall 11126. The second sealing member 11152 may be made of, but is not limited to being made of, rubber, silicone, sealant, or the like, and is not specifically limited herein. In this embodiment, the second sealing member 11152 has an annular structure. The second sealing member 11152 is arranged around an outer peripheral side of the first inner annular wall 11112 and is pressed against and located between the first inner annular wall 11112 and the second inner annular wall 11126.

In some embodiments of this application, referring to FIG. 6, the outer casing 1111 includes the first inner annular wall 11112 and the first outer annular wall 11111 surrounding the first inner annular wall 11112. The second portion 11123 includes a third inner annular wall 11128 and a third outer annular wall 11127 that are disposed between the first inner annular wall 11112 and the first outer annular wall 11111. The third inner annular wall 11128 surrounds the first inner annular wall 11112. The third outer annular wall 11127 surrounds the third inner annular wall 11128. The second sealing assembly 1116 includes a third sealing member 11161 and a fourth sealing member 11162. The third sealing member 11161 is disposed between the first outer annular wall 11111 and the third outer annular wall 11127. The fourth sealing member 11162 is disposed between the first inner annular wall 11112 and the third inner annular wall 11128.

The third inner annular wall 11128 surrounds the first inner annular wall 11112. In other words, at least part of the first inner annular wall 11112 is disposed in an intra-annular space of the third inner annular wall 11128. The third outer annular wall 11127 surrounds the third inner annular wall 11128. In other words, the third inner annular wall 11128 is disposed in an intra-annular space of the third outer annular wall 11127. In general, the first inner annular wall 11112, the third inner annular wall 11128, the third outer annular wall 11127, and the first outer annular wall 11111 are sequentially arranged one inside another in the radial direction of the motor 11.

The third sealing member 11161 is a member for closing a gap between the first outer annular wall 11111 and the third outer annular wall 11127. The third sealing member 11161 may be made of, but is not limited to being made of, rubber, silicone, sealant, or the like, and is not specifically limited herein. In this embodiment, the third sealing member 11161 has an annular structure. The third sealing member 11161 is arranged around an outer peripheral side of the third outer annular wall 11127 and is located between and pressed against the first outer annular wall 11111 and the third outer annular wall 11127.

The fourth sealing member 11162 is a member for closing a gap between the first inner annular wall 11112 and the third inner annular wall 11128. The fourth sealing member 11162 may be made of, but is not limited to being made of, rubber, silicone, sealant, or the like, and is not specifically limited herein. In this embodiment, the fourth sealing member 11162 has an annular structure. The fourth sealing member 11162 is arranged around an outer peripheral side of the third inner annular wall 11128 and is pressed against and located between the first inner annular wall 11112 and the third inner annular wall 11128.

With the above-mentioned technical solution, the first cavity body 11131 and the second cavity body 11132 can be effectively formed.

In some embodiments of this application, also referring to FIG. 5 and FIG. 6, the first cavity body 11131 is in communication with the second cavity body 11132.

The first cavity body 11131 is in communication with the second cavity body 11132, which means that the cooling medium can enter the first cooling flow channel 11311 through a necessary communication structure. The communication structure may be disposed in the casing 111. For example, a channel is formed in the inner casing 1112 to communicate the first cooling flow channel 11311 and the first accommodation cavity 1113. The communication structure may also be disposed outside the inner casing 1112. For example, a duct is disposed outside the inner casing 1112 to communicate the first cooling flow channel 11311 and the first accommodation cavity 1113.

With the above-mentioned technical solution, the cooling medium can flow between the first cavity body 11131 and the second cavity body 11132, which effectively reduces a difference between an amount of cooling medium injected into the first cavity body 11131 and an amount of cooling medium injected into the second cavity body 11132. Therefore, an overall heat distribution of the motor 11 becomes balanced, which effectively improves operation performance of the motor 11.

In some embodiments of this application, also referring to FIG. 5 and FIG. 6, the casing 111 further has a communication channel 1117 spaced apart from the second accommodation cavity 1114. The first cavity body 11131 is in communication with the second cavity body 11132 through the communication channel 1117.

The communication channel 1117 is configured to provide for the cooling medium a flow path between the first cavity body 11131 and the second cavity body 11132. One or a plurality of communication channels 1117 may be provided as desired. When one communication channel 1117 is provided, the cooling medium may enter the second cavity body 11132 along the communication channel 1117 from the first cavity body 11131, or may enter the first cavity body 11131 along the communication channel 1117 from the second cavity body 11132. When a plurality of communication channels 1117 are provided, the cooling medium may enter the second cavity body 11132 from the first cavity body 11131 along one of the plurality of communication channels 1117, or may enter the first cavity body 11131 from the second cavity body 11132 along one of the remaining of the plurality of communication channels 1117. A specific flow direction of the cooling medium in the communication channel 1117 is not limited herein.

With the above-mentioned technical solution, communication between the first cavity body 11131 and the second cavity body 11132 is effectively realized.

Figure 7:
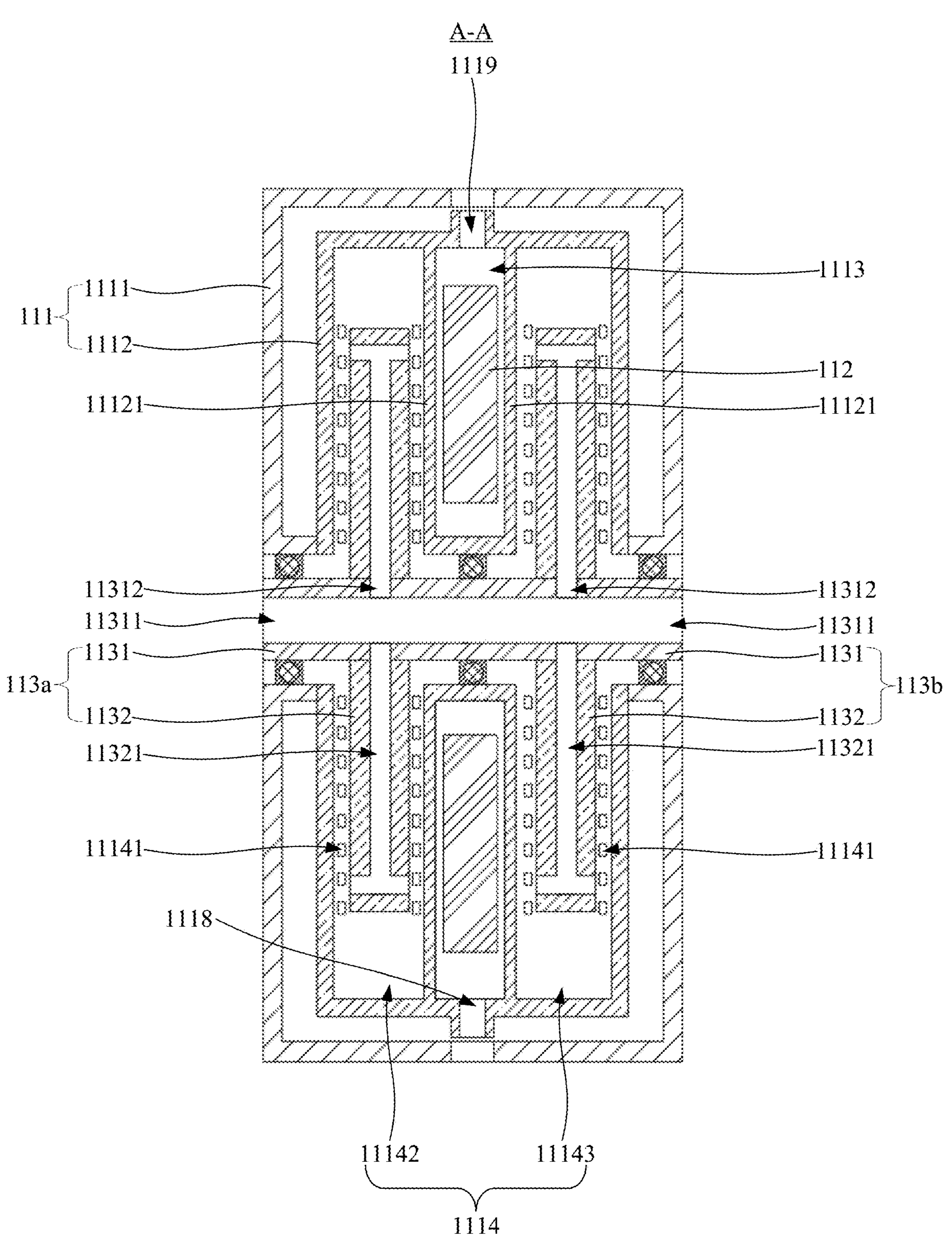
FIG. 7 is a third schematic cross-sectional structural view of a motor in the electric drive device along line A-A as illustrated in FIG. 4.
Figure 8:
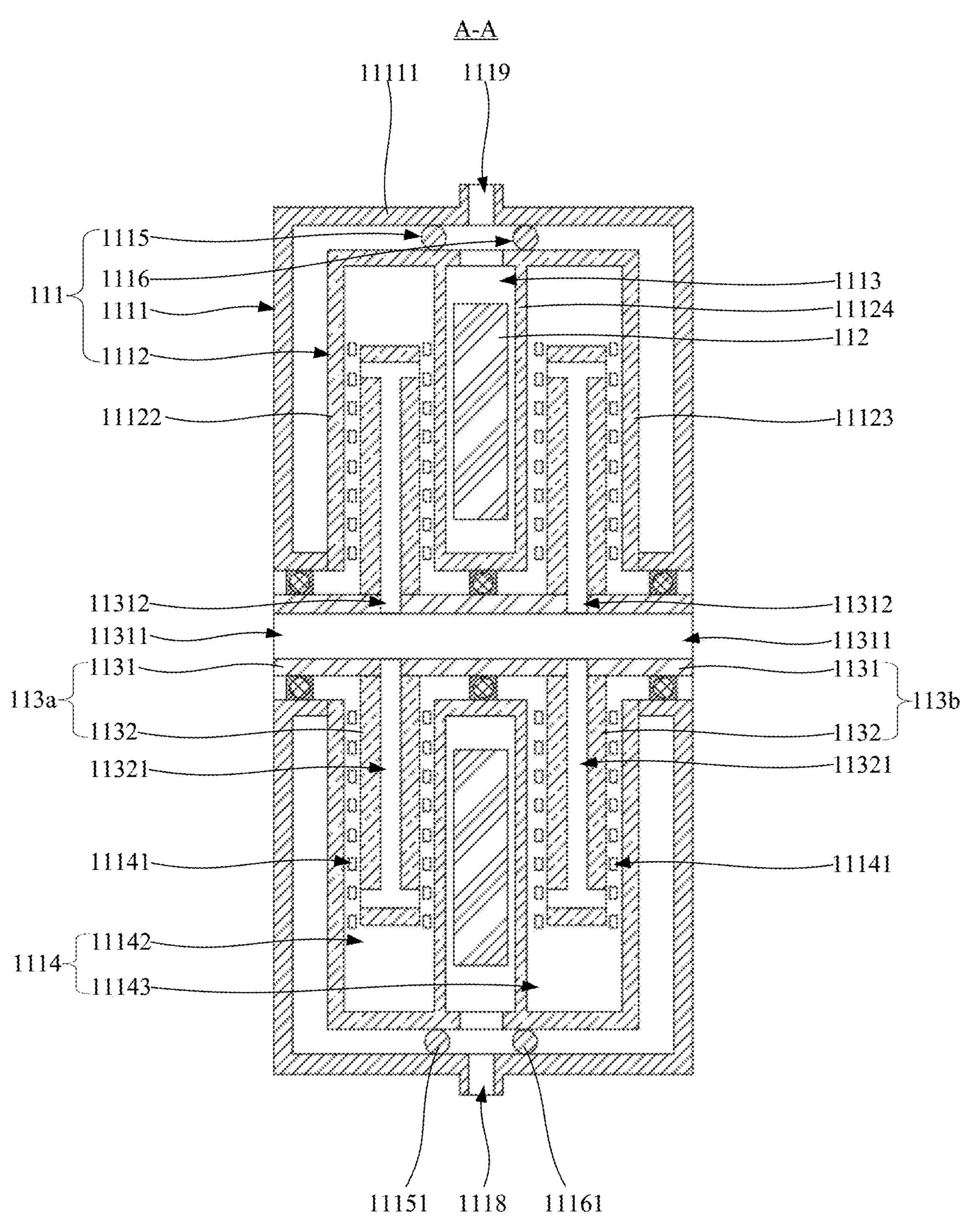
FIG. 8 is a fourth schematic cross-sectional structural view of a motor in the electric drive device along line A-A as illustrated in FIG. 4.

In some embodiments of this application, also referring to FIG. 7 and FIG. 8, the second accommodation cavity 1114 includes a third cavity body 11142 and a fourth cavity body 11143. The rotor 113 includes a first rotor 113*a* disposed in the third cavity body 11142 and a second rotor 113*b* disposed in the fourth cavity body 11143. The first accommodation cavity 1113 is formed between the third cavity body 11142 and the fourth cavity body 11143.

The first accommodation cavity 1113 is formed between the third cavity body 11142 and the fourth cavity body 11143. In other words, the stator 112 is disposed between the first rotor 113*a* and the second rotor 113*b*. In other words, in this embodiment, the motor 11 is a dual-rotor, single-stator motor. The third cavity body 11142 is spaced apart from the first accommodation cavity 1113. The fourth cavity body 11143 is spaced apart from the first accommodation cavity 1113.

With the above-mentioned technical solution, the stator 112 can be in direct contact with the cooling medium, in such a manner that the cooling medium can effectively absorb the heat generated by the stator 112. Therefore, the cooling efficiency of the dual-rotor 113 motor 11 can be effectively improved.

In some embodiments of this application, referring to FIG. 8, the casing 111 includes the outer casing 1111, the inner casing 1112, the first sealing assembly 1115, and the second sealing assembly 1116. The inner casing 1112 includes the first portion 11122, the second portion 11123, and the third portion 11124 disposed between the first portion 11122 and the second portion 11123. The first accommodation cavity 1113 is defined by the third portion 11124, the first sealing assembly 1115, the second sealing assembly 1116, and the outer casing 1111.

The first sealing assembly 1115 is an assembly for closing a gap between a side of the third portion 11124 and the inner wall of the outer casing 1111. The second sealing assembly 1116 is an assembly for closing a gap between another side of the third portion 11124 and the inner wall of the outer casing 1111. Therefore, the cooling medium in the first cavity body 11131 can be prevented from directly entering the second accommodation cavity 1114.

With the above-mentioned technical solution, the first accommodation cavity 1113 is effectively formed.

In some embodiments of this application, referring to FIG. 8, the third cavity body 11142 is formed in the first portion 11122, or the third cavity body 11142 is defined by the first portion 11122, the first sealing assembly 1115, and the outer casing 1111.

In other words, the third cavity body 11142 may be formed directly in the first portion 11122. For example, the first portion 11122 is integrally formed with the third cavity body 11142 through an injection molding process. The third cavity body 11142 may also be defined by the first portion 11122, the first sealing assembly 1115, and the outer casing 1111.

With the above-mentioned technical solution, the third cavity body 11142 can be formed effectively and spaced apart from the first accommodation cavity 1113.

In some embodiments of this application, referring to FIG. 8, the fourth cavity body 11143 is formed in the second portion 11123, or the fourth cavity body 11143 is defined by the second portion 11123, the second sealing assembly 1116, and the outer casing 1111.

In other words, the fourth cavity body 11143 may be formed directly in the second portion 11123. For example, the second portion 11123 is integrally formed with the fourth cavity body 11143 through an injection molding process. The fourth cavity body 11143 may also be defined by the second portion 11123, the second sealing assembly 1116, and the outer casing 1111.

With the above-mentioned technical solution, the fourth cavity body 11143 can be formed effectively and spaced apart from the first accommodation cavity 1113.

In some embodiments of this application, referring to FIG. 8, the outer casing 1111 includes a first inner annular wall 11112 and a first outer annular wall 11111 surrounding the first inner annular wall 11112. The first sealing assembly 1115 includes a first sealing member 11151. The first sealing member 11151 is disposed between the first outer annular wall 11111 and a side of the third portion 11124 in an axial direction of the motor 11. The second sealing assembly 1116 includes a third sealing member 11161 disposed between the first outer annular wall 11111 and another side of the third portion 11124 in the axial direction of the motor 11.

With the above-mentioned technical solution, the first accommodation cavity 1113 is effectively formed.

In some embodiments of this application, also referring to FIG. 5 and FIG. 7, the casing 111 includes the outer casing 1111 and the inner casing 1112 disposed in the outer casing 1111. The first accommodation cavity 1113 and the second accommodation cavity 1114 are formed in the inner casing 1112.

The outer casing 1111 is configured to provide an internal mounting environment for the casing 111 and to insulate the internal mounting environment from an external environment of the casing 111. The inner casing 1112 is configured to provide a mounting environment for the stator 112 and the rotor 113. In some embodiments, the outer casing 1111 is made of a metal such as copper, iron, aluminum, stainless steel, or aluminum alloy, while the inner casing 1112 is made of an insulation material. The insulation material may be plastic or the like, to insulate and separate the stator 112 and rotor 113 from the outer casing 1111. In other embodiments, the outer casing 1111 and the inner casing 1112 may also be made of a same material. For example, both the outer casing 1111 and the inner casing 1112 are made of plastic.

In other words, the first accommodation cavity 1113 and the second accommodation cavity 1114 are formed directly in the inner casing 1112. The first accommodation cavity 1113 is in no communication with a space between the outer casing 1111 and the inner casing 1112, while the second accommodation cavity 1114 may be in communication with or in no communication with the space between the outer casing 1111 and the inner casing 1112. In this embodiment, both a liquid inlet pipeline 124 and a liquid outlet pipeline are directly connected to the inner casing 1112 and in communication with the first accommodation cavity 1113. Therefore, the cooling medium can directly enter the first accommodation cavity 1113 through the liquid inlet pipeline 124 and can leave the first accommodation cavity 1113 through the liquid outlet pipeline.

With the above-mentioned technical solution, the first accommodation cavity 1113 and the second accommodation cavity 1114 can be formed effectively and spaced apart from each other.

In some embodiments of this application, also referring to FIG. 5 and FIG. 7, the inner casing 1112 includes a casing body and a partition 11121. The partition 11121 is disposed in the casing body to partition an internal space of the casing body into the first accommodation cavity 1113 and the second accommodation cavity 1114.

The casing body is a main portion of the inner casing 1112 and is configured to provide an internal mounting environment of the inner casing 1112.

The partition 11121 is a component for separating the first accommodation cavity 1113 and the second accommodation cavity 1114 and is connected within the casing body. Specifically, an outer peripheral edge of the partition 11121 is sealingly connected to an inner peripheral wall of the casing body. The first accommodation cavity 1113 is formed at a side of the partition 11121. The second accommodation cavity 1114 is formed at another side of the partition 11121.

In some embodiments, the casing body and the partition 11121 may be of an integrally molded structure. For example, the casing body and the partition 11121 are integrally molded through an injection molding process. In other embodiments, the casing body and the partition 11121 may also be molded separately and then connected to each other.

Referring to FIG. 5, in a case where the first accommodation cavity 1113 includes the first cavity body 11131 and the second cavity body 11132, the casing body is internally provided with two partitions 11121. The second accommodation cavity 1114 is formed between the two partitions 11121. The first cavity body 11131 is formed at a side of one of the two partitions 11121 facing away from the second accommodation cavity 1114. The second cavity body 11132 is formed at a side of the other one of the two partitions 11121 facing away from the second accommodation cavity 1114.

Referring to FIG. 7, in a case where the second accommodation cavity 1114 includes the third cavity body 11142 and the fourth cavity body 11143, two partitions 11121 are disposed in the casing body. The first accommodation cavity 1113 is formed between the two partitions 11121. The third cavity body 11142 is formed at a side of one of the two partitions 11121 facing away from the first accommodation cavity 1113. The fourth cavity body 11143 is formed at a side of the other one of the two partitions 11121 facing away from the first accommodation cavity 1113.

With the above-mentioned technical solution, the first accommodation cavity 1113 and the second accommodation cavity 1114 can be effectively spaced apart from each other.

Figure 9:
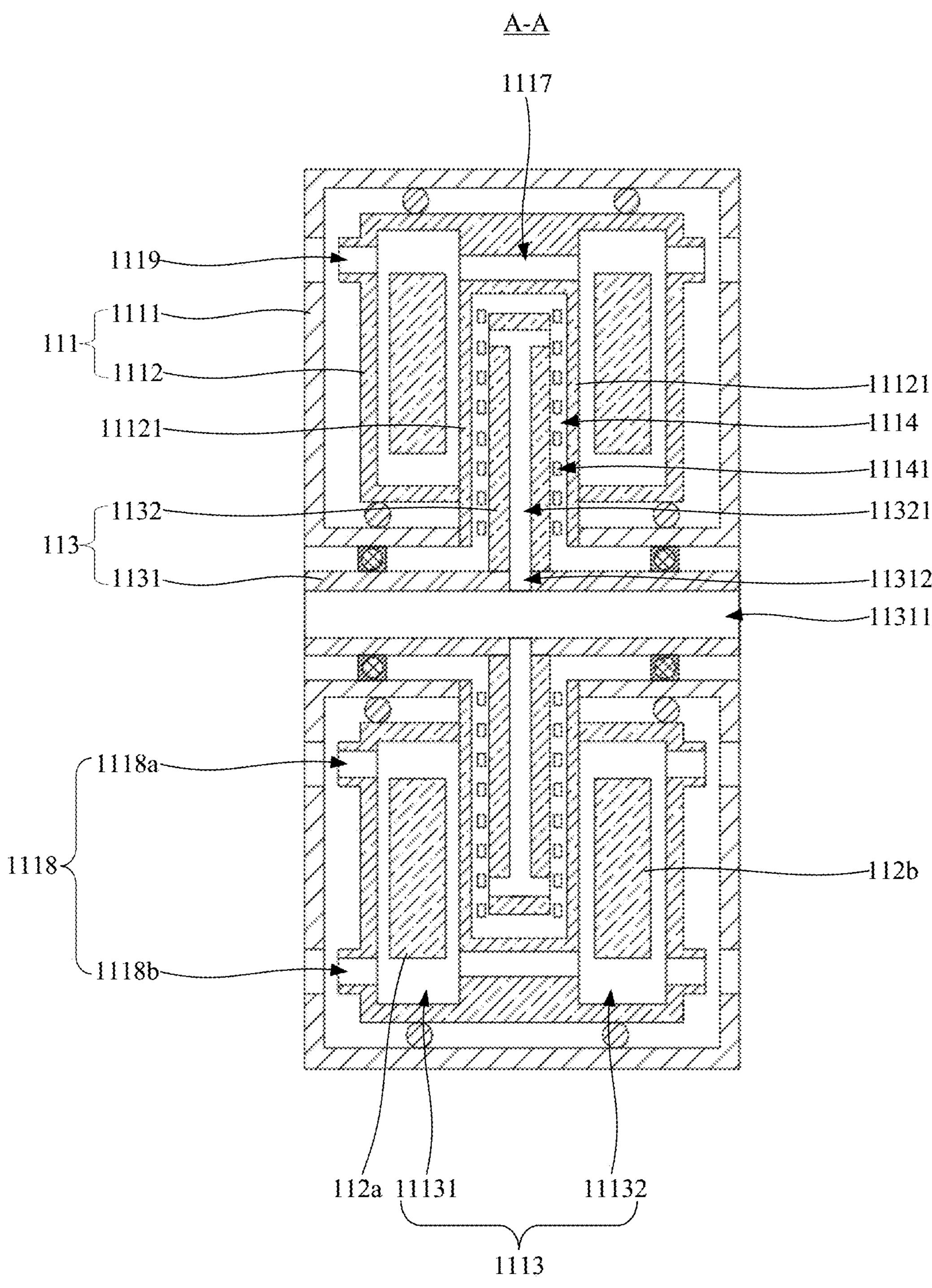
FIG. 9 is a fifth schematic cross-sectional structural view of a motor in the electric drive device along line A-A as illustrated in FIG. 4.

In some embodiments of this application, referring to FIG. 9, the casing 111 is provided with a cooling medium inlet 1118 and a cooling medium outlet 1119 that are respectively in communication with the first accommodation cavity 1113. The cooling medium inlet 1118 includes a first inlet 1118*a*. The first inlet 1118*a* is located at an inner peripheral side of the stator 112. The cooling medium outlet 1119 is located at an outer peripheral side of the stator 112.

The cooling medium inlet 1118 is configured to provide an access for the cooling medium to the first accommodation cavity 1113. The first inlet 1118*a* is configured to provide an access for the cooling medium to enter an inner space of the stator 112. The first inlet 1118*a* is located at an inner peripheral side of the stator 112, which means that at least part of the first inlet 1118*a* is arranged opposite to the inner space of the stator 112, to allow the cooling medium to directly enter the inner space of the stator 112 through the first inlet 1118*a*.

The cooling medium outlet 1119 is configured to provide an access for the cooling medium to leave the casing 111. The cooling medium outlet 1119 is located at an outer peripheral side of the stator 112, which means that at least part of the cooling medium outlet 1119 is arranged opposite to an outer space of the stator 112, to allow the cooling medium to be discharged from the outer peripheral side of the stator 112 to an outside of the casing 111 through the cooling medium outlet 1119. One or a plurality of cooling medium outlets 1119 may be provided.

With the above-mentioned technical solution, the cooling medium can enter the inner space of the stator 112 through the first inlet 1118*a*, and then flow from the inner peripheral side of the stator 112 to the outer peripheral side of the stator 112 through gaps of the stator 112. Then, the cooling medium can be discharged out of the casing 111 through the cooling medium outlet 1119. In this way, the cooling medium can be in sufficient contact with the stator 112. Therefore, the heat generated by the stator 112 can be absorbed more effectively, which in turn further improves the cooling efficiency of the motor 11.

In some embodiments of this application, referring to FIG. 9, the cooling medium inlet 1118 further includes a second inlet 1118*b* in communication with the first accommodation cavity 1113. The second inlet 1118*b* is located at the outer peripheral side of the stator 112.

The second inlet 1118*b* is configured to provide an access for the cooling medium to enter the outer space of the stator 112. The second inlet 1118*b* is located at the outer peripheral side of the stator 112, which means that at least part of the second inlet 1118*b* is arranged opposite to the outer space of the stator 112, to allow the cooling medium to directly enter the outer space of the stator 112 through the second inlet 1118*b*.

Figure 10:
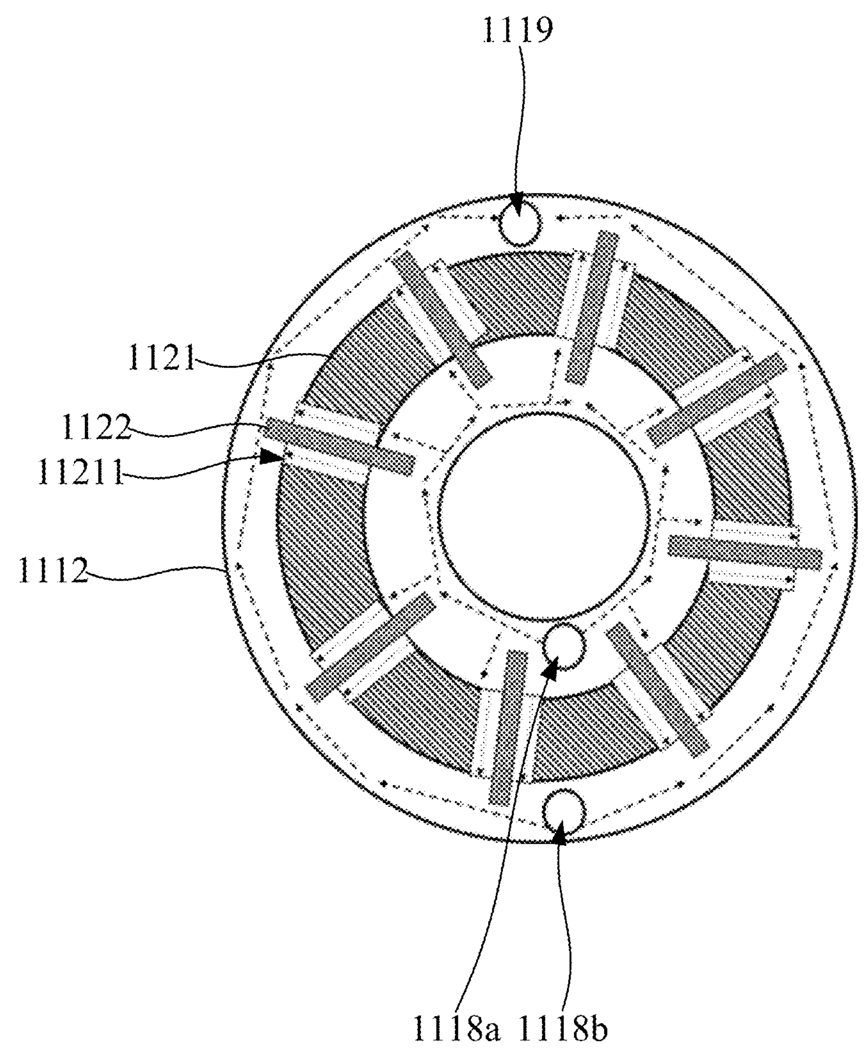
FIG. 10 is a schematic structural view of a cooling medium flow path in a motor as illustrated in FIG. 9.

As illustrated in FIG. 10, during an operation, part of the cooling medium enters the inner space of the stator 112 through the first inlet 1118*a*, and then flows from the inner peripheral side of the stator 112 to the outer peripheral side of the stator 112 through gaps of the stator 112. Another part of the cooling medium enters the outer space of the stator 112 from the second inlet 1118*b*. The two parts of cooling medium flow towards the cooling medium outlet 1119 and are discharged out of the casing 111 through the cooling medium outlet 1119. Therefore, the heat generated by the stator 112 can be absorbed by the cooling medium to cool the stator 112.

With the above-mentioned technical solution, the cooling medium can not only enter the inner space of the stator 112 through the first inlet 1118*a*, but also enter an outer space of the stator 112 through the second inlet 1118*b*, in such a manner that the cooling medium can be in more sufficient contact with the stator 112. Therefore, the heat generated by the stator 112 can be absorbed more effectively, which in turn further improves the cooling efficiency of the motor 11.

In some embodiments of this application, referring to FIG. 9, the second inlet 1118*b* and the cooling medium outlet 1119 are formed at two opposite sides of the stator 112 in a radial direction, respectively.

In some embodiments, the second inlet 1118*b*, the first inlet 1118*a*, and the cooling medium outlet 1119 may be arranged sequentially in a same radial direction of the stator 112. The first inlet 1118*a* is located at the inner peripheral side of the stator 112. The second inlet 1118*b* and the cooling medium outlet 1119 are located at the outer peripheral side of the stator 112.

With the above-mentioned technical solution, after entering the outer space of the stator 112 from the second inlet 1118*b*, the cooling medium can flow, in an outer peripheral direction of the stator 112, from a side of the stator 112 in the radial direction to another side of the stator 112 in the same radial direction, and be finally discharged out of the casing 111 from the cooling medium outlet 1119. In this way, the cooling medium can be in more sufficient contact with the stator 112. Therefore, the heat generated by the stator 112 can be absorbed more effectively, which in turn further improves the cooling efficiency of the motor 11.

In some embodiments of this application, referring to FIG. 9, the motor 11 further includes the rotor 113. The casing 111 further has the second accommodation cavity 1114 spaced apart from the first accommodation cavity 1113. The rotor 113 is disposed in the second accommodation cavity 1114. The first accommodation cavity 1113 includes the first cavity body 11131 and the second cavity body 11132. The stator 112 includes the first stator 112*a* disposed in the first cavity body 11131 and the second stator 112*b* disposed in the second cavity body 11132. The second accommodation cavity 1114 is formed between the first cavity body 11131 and the second cavity body 11132.

In some embodiments, the casing 111 includes the outer casing 1111 and the inner casing 1112 disposed in the outer casing 1111. The outer casing 1111 is configured to provide the internal mounting environment for the casing 111 and to insulate the internal mounting environment from the external environment of the casing 111. The inner casing 1112 is configured to provide the mounting environment for the stator 112 and the rotor 113. In some embodiments, the outer casing 1111 is made of a metal such as copper, iron, aluminum, stainless steel, or aluminum alloy, while the inner casing 1112 is made of an insulation material. The insulation material may be plastic or the like, to insulate and separate the stator 112 and rotor 113 from the outer casing 1111. In other embodiments, the outer casing 1111 and the inner casing 1112 may also be made of a same material. For example, both the outer casing 1111 and the inner casing 1112 are made of plastic.

The inner casing 1112 has the first accommodation cavity 1113 and the second accommodation cavity 1114. In other words, the first accommodation cavity 1113 and the second accommodation cavity 1114 are formed directly in the inner casing 1112. The first accommodation cavity 1113 may be in communication with or in no communication with the space between the outer casing 1111 and the inner casing 1112. Similarly, the second accommodation cavity 1114 may be in communication with or in no communication with the space between the outer casing 1111 and the inner casing 1112.

The second accommodation cavity 1114 is formed between the first cavity body 11131 and the second cavity body 11132. The first stator 112*a* is disposed in the first cavity body 11131. The second stator 112*b* is disposed in the second cavity body 11132. In other words, the rotor 113 is disposed between the first stator 112*a* and the second stator 112*b*. In other words, in this embodiment, the motor 11 is a dual-stator, single-rotor motor. It should be understood that, the first cavity body 11131 is spaced apart from the second accommodation cavity 1114, and the second cavity body 11132 is spaced apart from the second accommodation cavity 1114.

In some embodiments, two cooling medium outlets 1119 are provided. One of the two cooling medium outlets 1119 is in communication with the first cavity body 11131. The other one of the two cooling medium outlets 1119 is in communication with the second cavity body 11132. The two cooling medium outlets 1119 may communicate with each other via an external pipeline. Therefore, the cooling medium flowing through the two cooling medium outlets 1119 can converge and then be discharged out of the motor 11 along the external pipeline.

In some embodiments, the outer casing 1111 has a first pipe connection opposite to the cooling medium inlet 1118 and a second pipe connection opposite to the cooling medium outlet 1119. The liquid inlet pipeline 124 is directly connected to the cooling medium inlet 1118 after passing through the first pipe connection. The liquid outlet pipeline is directly connected to the cooling medium outlet 1119 after passing through the second pipe connection. Therefore, the cooling medium can enter the first accommodation cavity 1113 directly through the liquid inlet pipeline 124 and leave the first accommodation cavity 1113 through the liquid outlet pipeline.

With the above-mentioned technical solution, the cooling efficiency of the dual-stator, single-rotor motor can be effectively improved.

In some embodiments of this application, referring to FIG. 9, the cooling medium inlet 1118 includes a plurality of first inlets 1118*a*. At least one of the plurality of first inlets 1118*a* is located at a side of the first stator 112*a* facing away from the rotor 113 and in communication with the first cavity body 11131. At least one of the remaining of the plurality of first inlets 1118*a* is located at a side of the second stator 112*b* facing away from the rotor 113 and in communication with the second cavity body 11132.

A quantity of the first inlets 1118*a* may be set as desired. In some embodiments, two first inlets 1118*a* are provided. One of the two first inlets 1118*a* is located at the side of the first stator 112*a* facing away from the rotor 113 and in communication with the first cavity body 11131. The other one of the two first inlets 1118*a* is located at the side of the second stator 112*b* facing away from the rotor 113 and in communication with the second cavity body 11132.

With the above-mentioned technical solution, part of the cooling medium can enter an inner space of the first stator 112*a* through a corresponding one of the plurality of first inlets 1118*a*. Then, this part of the cooling medium can flow from an inner peripheral side of the first stator 112*a* to an outer peripheral side of the first stator 112*a* through gaps of the first stator 112*a*. Similarly, another part of the cooling medium can enter an inner space of the second stator 112*b* through a corresponding one of the plurality of first inlets 1118*a*, and then flow from an inner peripheral side of the second stator 112*b* to an outer peripheral side of the second stator 112*b* through gaps of the second stator 112*b*. Then, the cooling medium can be discharged out of the casing 111 through the cooling medium outlet 1119. In this way, the cooling medium can be in more sufficient contact with not only the first stator 112*a* but also the second stator 112*b*. Therefore, the heat generated by the first stator 112*a* and the heat generated by the second stator 112*b* can be more effectively absorbed, which in turn further improves the cooling efficiency of the motor 11.

In some embodiments of this application, referring to FIG. 9, the cooling medium inlet 1118 further includes a plurality of second inlets 1118*b*. At least one of the plurality of second inlets 1118*b* is in communication with the first cavity body 11131. At least one of the remaining of the plurality of second inlets 1118*b* is in communication with the second cavity body 11132.

A quantity of the second inlets 1118*b* may be set as desired. In some embodiments, two second inlets 1118*b* are provided. One of the two second inlets 1118*b* is in communication with the first cavity body 11131. The other one of the two second inlets 1118*b* is in communication with the second cavity body 11132.

With the above-mentioned technical solution, part of the cooling medium can enter an outer space of the first stator 112*a* through a corresponding one of the plurality of second inlets 1118*b*. Another part of the cooling medium can enter an outer space of the second stator 112*b* through a corresponding one of the plurality of second inlets 1118*b*. Then, the cooling medium can be discharged out of the casing 111 through the cooling medium outlet 1119. In this way, the cooling medium can be in more sufficient contact with the first stator 112*a* and the second stator 112*b*. Therefore, the heat generated by the first stator 112*a* and the heat generated by the second stator 112*b* can be more effectively absorbed, which in turn further improves the cooling efficiency of the motor 11.

In some embodiments of this application, referring to FIG. 9, the first inlet 1118*a* is located at a side of the stator 112 facing away from the rotor 113.

With the above-mentioned technical solution, formation of the first inlet 1118*a* at the casing 111 can be facilitated.

In some embodiments of this application, the first inlet 1118*a* is opened in a direction parallel to an axial direction of the rotor 113.

In other words, in a process of the cooling medium entering the inner space of the stator 112 through the first inlet 1118*a*, the flow direction of the cooling medium is substantially parallel to the axial direction of the rotor 113. Therefore, the cooling medium can flow along an axis of the rotor 113.

With the above-mentioned technical solution, a flow speed of the cooling medium in the stator 112 can be effectively improved to effectively improve a convective heat transfer coefficient between the cooling medium and the stator 112. Therefore, the cooling medium can more effectively absorb the heat generated by the stator 112, which in turn further improves the cooling efficiency of the motor 11.

In some embodiments of this application, referring to FIG. 10, the stator 112 includes an iron core 1121 and a winding 1122. The iron core 1121 has a wire winding groove 11211. The wire winding groove 11211 extends through an inner peripheral side of the iron core 1121 and an outer peripheral side of the iron core 1121. The winding 1122 is disposed at the wire winding groove 11211 in a winding manner. The cooling medium flows from the first inlet 1118*a* to the cooling medium outlet 1119 through the wire winding groove 11211.

The iron core 1121 is a main component of the stator 112 and forms a magnetic circuit of the motor 11 along with the winding 1122. When energized, the winding 1122 generates an electromagnetic field magnetically coupled to the rotor 113, for driving the rotor 113 to rotate. In some embodiments, the iron core 1121 may be an assembled assembly assembled from a plurality of components. For example, the iron core 1121 is formed by laminating a plurality of laminations to each other. In other embodiments, the iron core 1121 may also be an integrally molded member. For example, the iron core 1121 is integrally molded through a casting process.

The wire winding groove 11211 is configured to provide a placement space for the winding 1122. A plurality of wire winding grooves 11211 may be provided and arranged at intervals in a circumferential direction of the stator 112. The windings 1122 are disposed sequentially at respective wire winding grooves 11211 in a winding manner. The wire winding groove 11211 extends through an inner peripheral side of the iron core 1121 and an outer peripheral side of the iron core 1121, which means that the wire winding groove 11211 communicates with the inner space of the stator 112 and the outer space of the stator 112.

With the above-mentioned technical solution, a flow of the cooling medium from an inner side of the stator 112 to an outer side of the stator 112 can be facilitated to enable the cooling medium to be in more sufficient contact with the stator 112. Therefore, the heat generated by the stator 112 can be absorbed more effectively, which in turn further improves the cooling efficiency of the motor 11.

In some embodiments of this application, also referring to FIG. 5 to FIG. 9, the casing 111 has a cooling medium inlet 1118 and a cooling medium outlet 1119 that are respectively in communication with the first accommodation cavity 1113. The cooling medium inlet 1118 is located at a height h1 smaller than a height h2 of the cooling medium outlet 1119.

The height h1 of the cooling medium inlet 1118 refers to a distance between the cooling medium inlet 1118 and the ground plane when the motor 11 is in use. Similarly, the height h2 of the cooling medium outlet 1119 refers to a distance between the cooling medium outlet 1119 and the ground plane when the motor 11 is in use.

Since the height h1 of the cooling medium inlet 1118 is set to be smaller than the height h2 of the cooling medium outlet 1119, the cooling medium can flow into the first accommodation cavity 1113 from a lower position of the casing 111 and flow out of the first accommodation cavity 1113 from a higher position of the casing 111. In this way, a gas inside the first accommodation cavity 1113 can be effectively discharged outwards to effectively avoid a phenomenon of air entrapment of the cooling medium. Therefore, the cooling efficiency of the motor 11 is further improved.

In some embodiments of this application, also referring to FIG. 5 to FIG. 9, the cooling medium inlet 1118 is formed at a bottom of the casing 111. The cooling medium outlet 1119 is formed at a top of the casing 111.

The bottom of the casing 111 and the top of the casing 111 may be two parts of the motor 11 divided by a central axis of the motor 11. The bottom of the casing 111 refers to a part of the casing 111 that is closest to the ground plane. The top of the casing 111 refers to a part of the casing 111 that is farthest from the ground plane.

With the above-mentioned technical solution, the phenomenon of air entrapment of the cooling medium can be further avoided, which in turn further improves the cooling efficiency of the motor 11.

In some embodiments, in a case where the first accommodation cavity 1113 includes the first cavity body 11131 and the second cavity body 11132 and in a case where the second accommodation cavity 1114 is formed between the first cavity body 11131 and the second cavity body 11132, the cooling medium inlet 1118 and the cooling medium outlet 1119 are in direct communication with first cavity body 11131, and the first cavity body 11131 is in communication with the second cavity body 11132 via at least two communication channels 1117. The cooling medium in one of the two communication channels 1117 flows from the first cavity body 11131 towards the second cavity body 11132. The cooling medium in the other one of the two communication channels 1117 flows from the second cavity body 11132 towards the first cavity body 11131.

In other embodiments, in the case where the first accommodation cavity 1113 includes the first cavity body 11131 and the second cavity body 11132 and the second accommodation cavity 1114 is formed between the first cavity body 11131 and the second cavity body 11132, the cooling medium inlet 1118 is in direct communicate with the first cavity body 11131, the cooling medium outlet 1119 is in direct communicate with the second cavity body 11132, and the first cavity body 11131 is in communication with the second cavity body 11132 through at least one communication channel 1117. The cooling medium in the communication channel 1117 flows from the first cavity body 11131 towards the second cavity body 11132.

In yet other embodiments, in the case where the first accommodation cavity 1113 includes the first cavity body 11131 and the second cavity body 11132 and the second accommodation cavity 1114 is formed between the first cavity body 11131 and the second cavity body 11132, the cooling medium outlet 1119 is in direct communicate with the first cavity body 11131, the cooling medium inlet 1118 is in direct communicate with the second cavity body 11132, and the first cavity body 11131 is in communication with the second cavity body 11132 through at least one communication channel 1117. The cooling medium in the communication channel 1117 flows from the second cavity body 11132 towards the first cavity body 11131.

Figure 3:
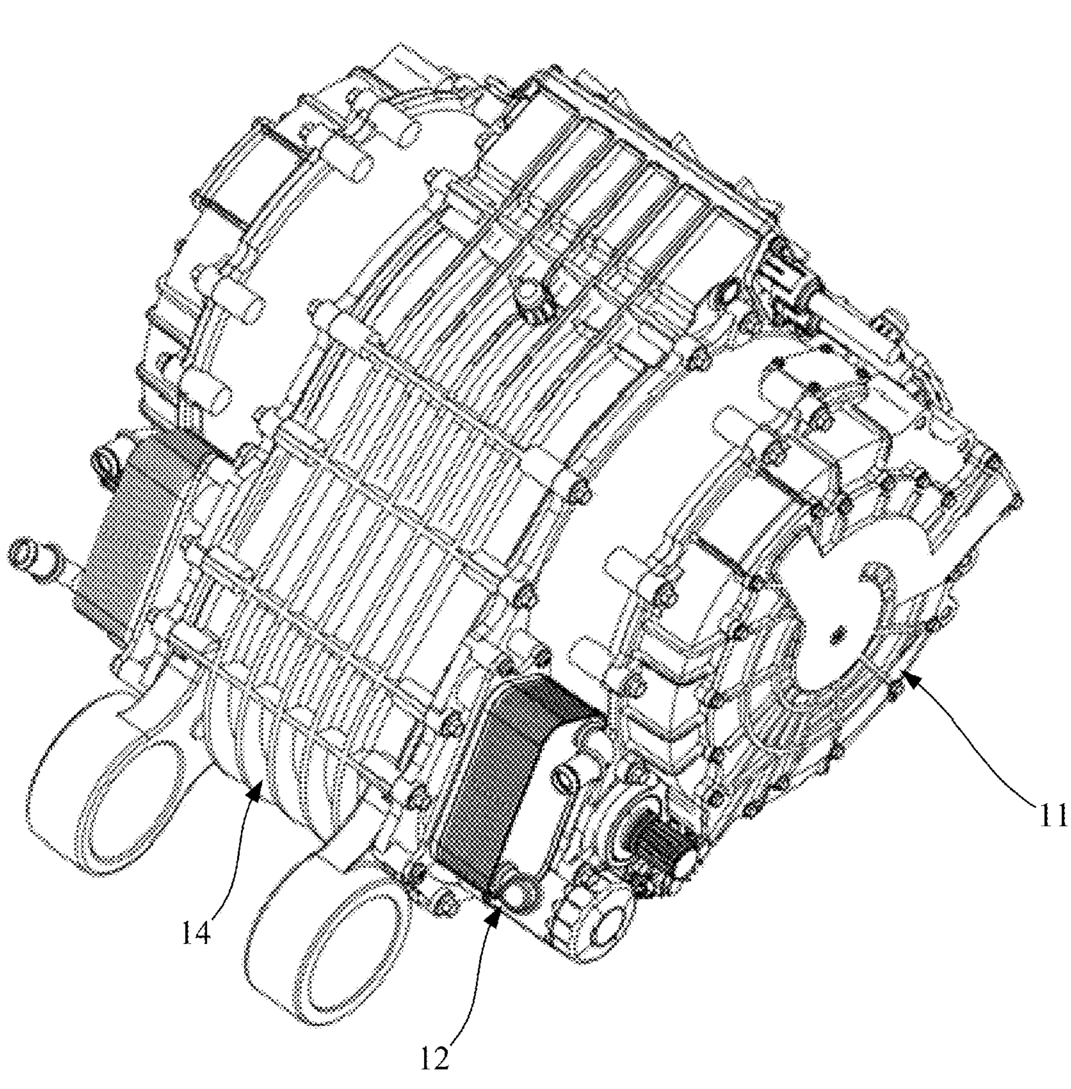
FIG. 3 is a schematic structural view of an electric drive device according to an embodiment of this application.
Figure 4:
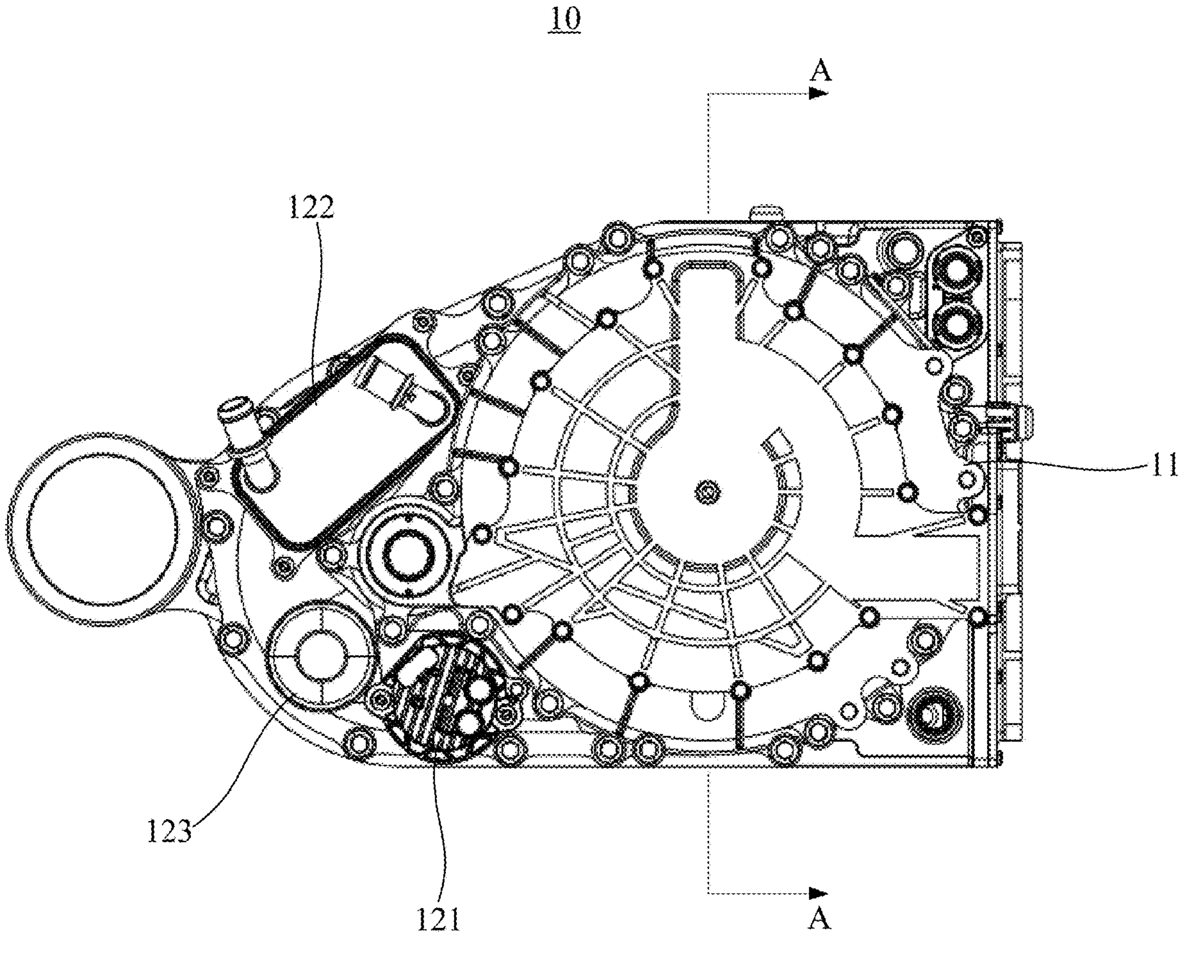
FIG. 4 is a schematic front structural view of the electric drive device as illustrated in FIG. 3.
Figure 11:
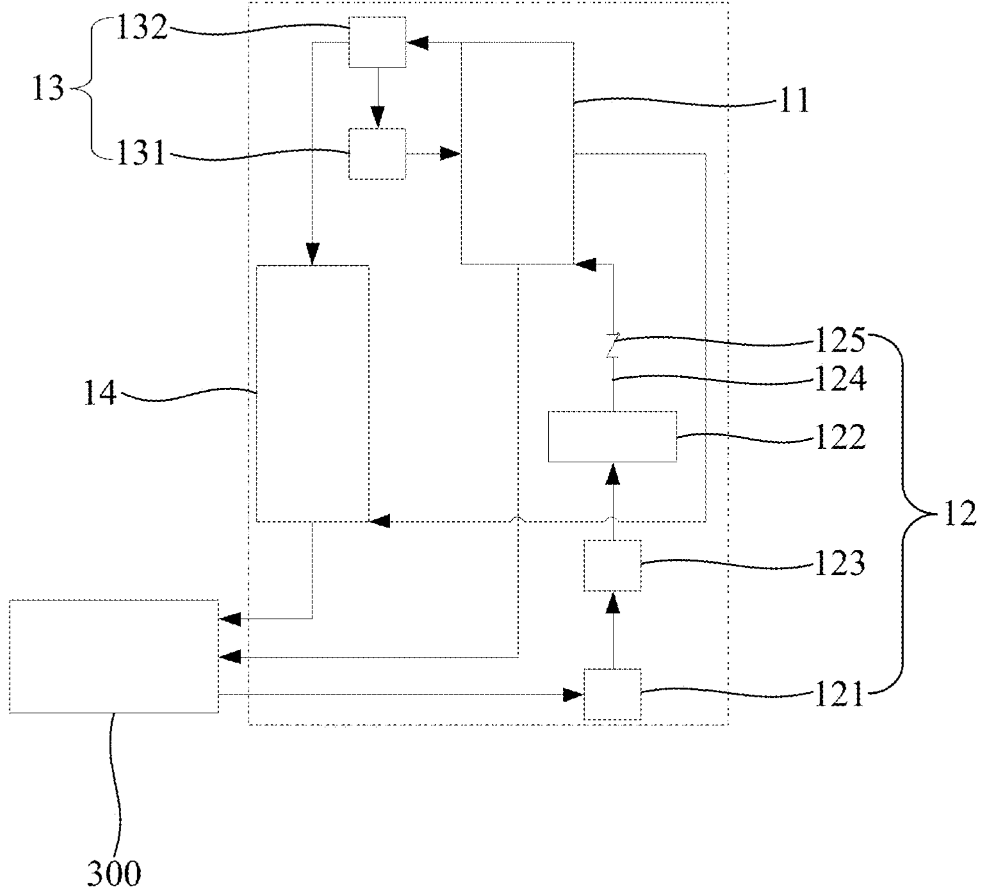
FIG. 11 is a schematic structural view of a cooling principle of an electric drive device according to an embodiment of this application.

Also referring to FIG. 3, FIG. 4, and FIG. 11, the embodiments of this application further provide an electric drive device 10. The electric drive device 10 includes a liquid supply mechanism 12 and the motor 11 according to any of the above-mentioned embodiments. The liquid supply mechanism 12 is in communication with the first accommodation cavity 1113 to deliver the cooling medium into the first accommodation cavity 1113.

The liquid supply mechanism 12 is a mechanism configured to provide the cooling medium for the first accommodation cavity 1113.

Specifically, referring to FIG. 11, the liquid supply mechanism 12 may include a liquid inlet pipeline 124 and a power pump 121. The liquid inlet pipeline 124 has an end connected to a liquid discharge opening of the power pump 121 and another end connected to the casing 111, to allow the liquid inlet pipeline 124 to be in communication with the first accommodation cavity 1113. The liquid inlet pipeline 124 is configured to provide a flow path for the cooling medium. The power pump 121 is configured to increase flowing power for the cooling medium.

In some embodiments, the liquid supply mechanism 12 may further include a heat exchanger 122. The heat exchanger 122 is disposed at the liquid inlet pipeline 124 and is configured to absorb heat from the cooling medium. It should be understood that, after the high-temperature cooling medium enters the heat exchanger 122, the heat exchanger 122 absorbs heat from the high-temperature cooling medium to convert the high-temperature cooling medium into the low-temperature cooling medium. The low-temperature cooling medium enters the first accommodation cavity 1113 to cool the stator 112.

In some embodiments, the liquid supply mechanism 12 may further include a filter 123 disposed at the liquid inlet pipeline 124 and is configured to filter out impurities from the cooling medium. The filter 123 may be disposed at an inlet side of the power pump 121 or an outlet side of the power pump 121. For example, the filter 123 is disposed between the power pump 121 and the heat exchanger 122.

Since the motor 11 according to any of the above-mentioned embodiments is adopted by the electric drive device 10 provided by the embodiments of this application, a cooling efficiency of the electric drive device 10 can be effectively improved, which is conducive to improving operation performance of the electric drive device 10.

In some embodiments of this application, referring to FIG. 11, the liquid supply mechanism 12 further includes a one-way valve 125. The one-way valve 125 is disposed at the liquid inlet pipeline 124, in such a manner that the cooling medium can flow from the liquid inlet pipeline 124 towards the first accommodation cavity 1113.

The one-way valve 125, also known as a check valve or a non-return valve, is a directional control valve permitting a fluid to flow in one direction only and not in an opposite direction. In some embodiments, the one-way valve 125 may be disposed at a position between an outlet of the power pump 121 and an inlet of the first accommodation cavity 1113. For example, the one-way valve 125 may be disposed at any one or more of a position between the power pump 121 and the filter 123, a position between the filter 123 and the heat exchanger 122, and a position between the heat exchanger 122 and the motor 11.

With the above-mentioned technical solution, a situation of reflux of the cooling medium that occurs after the cooling medium enters the first accommodation cavity 1113 can be effectively avoided to ensure that the first accommodation cavity 1113 accommodates enough cooling medium. In this way, the stator 112 can be fully immersed in the cooling medium, which in turn further improves the cooling efficiency of the motor 11.

Figure 14:
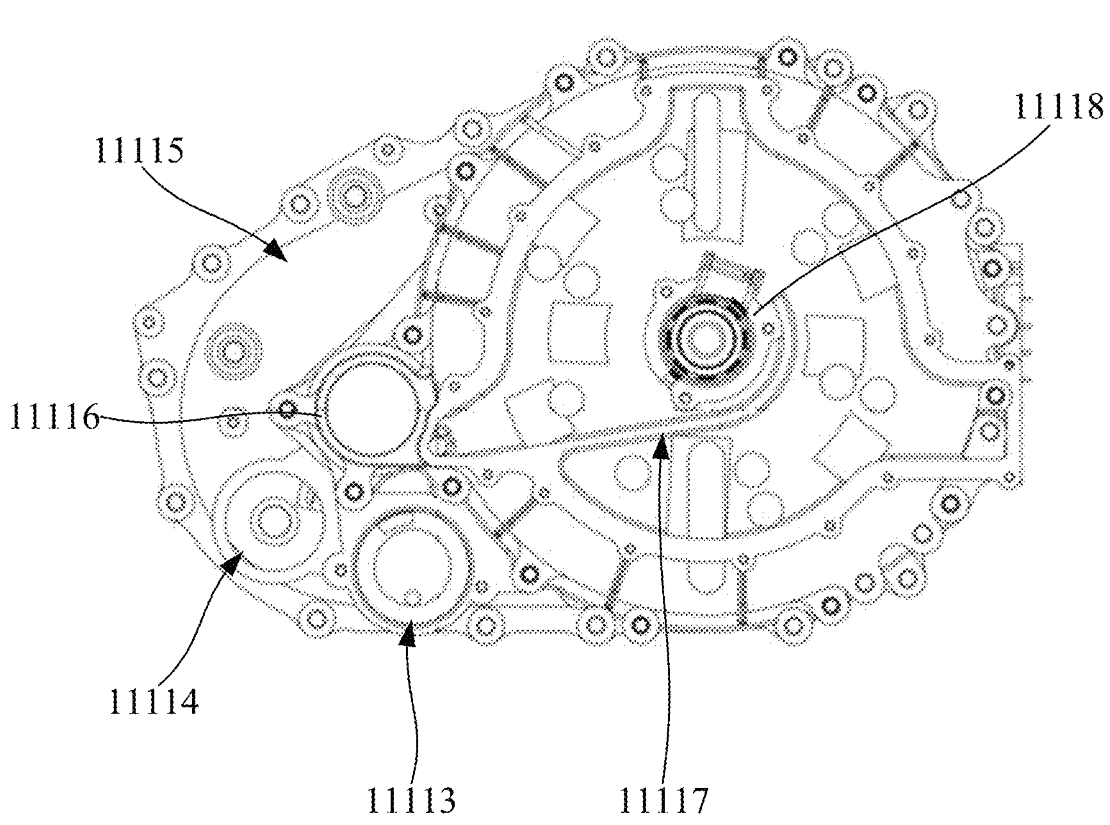
FIG. 14 is a schematic structural view of an outer casing according to an embodiment of this application.

In some embodiments of this application, also referring to FIG. 3, FIG. 4, and FIG. 14, the casing 111 has a first mounting space 11113. The power pump 121 is mounted in the first mounting space 11113.

In other embodiments of this application, also referring to FIG. 3, FIG. 4, and FIG. 14, the casing 111 has a second mounting space 11114. The heat exchanger 122 is mounted in the second mounting space 11114.

In yet other embodiments of this application, also referring to FIG. 3, FIG. 4, and FIG. 14, the casing 111 has a third mounting space 11115. The filter 123 is mounted in the third mounting space 11115.

In further embodiments of this application, also referring to n FIG. 3, FIG. 4, and FIG. 14, the casing 111 has the first mounting space 11113, the second mounting space 11114, and the third mounting space 11115. The power pump 121 is mounted in the first mounting space 11113. The heat exchanger 122 is mounted in the second mounting space 11114. The filter 123 is mounted in the third mounting space 11115.

The above-mentioned mounting space may be a mounting surface formed at the casing 111, or a mounting cavity formed at the casing 111, or a mounting base formed at the casing 111. To facilitate an arrangement of the liquid inlet pipeline 124, the first mounting space 11113, the second mounting space 11114, and the third mounting space 11115 are sequentially distributed in the flow direction of the cooling medium.

With the above-mentioned technical solution, an integration degree of the motor 11 can be effectively improved, which in turn effectively reduces a volume of the electric drive device 10.

Referring to FIG. 11, the embodiments of this application further provide an electric drive device 10. The electric drive device 10 includes a flow guide mechanism 13 and the motor 11 according to any of the above-mentioned embodiments. The first accommodation cavity 1113 is in communication with the first cooling flow channel 11311 through the flow guide mechanism 13.

The flow guide mechanism 13 is a mechanism configured to communicate the first accommodation cavity 1113 with the first cooling flow channel 11311. The flow guide mechanism 13 may be part or all of a communication structure between the first accommodation cavity 1113 and the first cooling flow channel 11311. In other words, the flow guide mechanism 13 may directly communicate between the first accommodation cavity 1113 and the first cooling flow channel 11311. Alternatively, the flow guide mechanism 13 may indirectly communicate with the first accommodation cavity 1113 and/or the first cooling flow channel 11311 through another communication structure.

Since the motor 11 according to any of the above-mentioned embodiments is adopted by the electric drive device 10 provided by the embodiments of this application, a cooling efficiency of the electric drive device 10 can be effectively improved, which is conducive to improving operation performance of the electric drive device 10.

Figure 12:
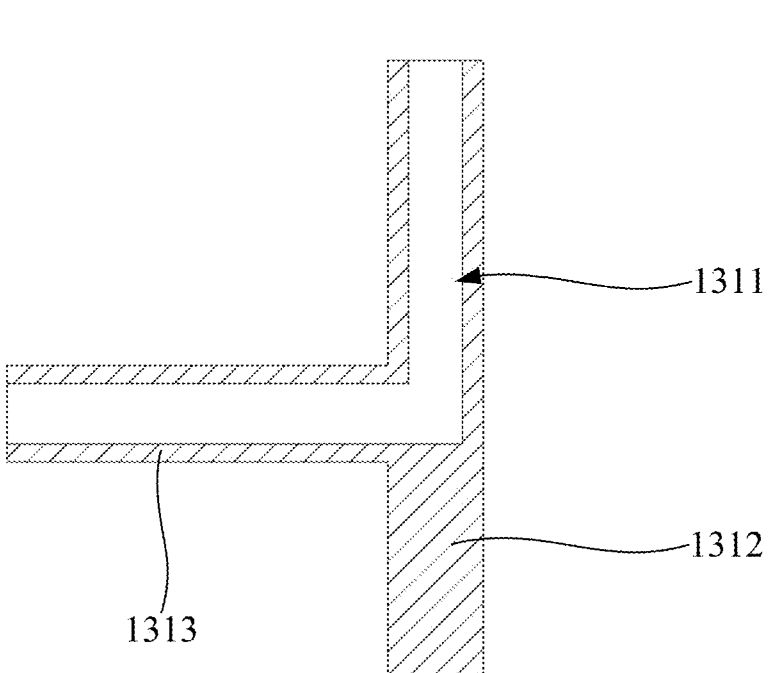
FIG. 12 is a schematic structural view of a flow guide member according to an embodiment of this application.

In some embodiments of this application, referring to FIG. 12, the flow guide mechanism 13 includes a flow guide member 131 having a flow guide channel 1311. The first accommodation cavity 1113 is in communication with the first cooling flow channel 11311 through the flow guide channel 1311.

The flow guide member 131 is a member configured to communicate the first accommodation cavity 1113 with the first cooling flow channel 11311. The flow guide channel 1311 is configured to provide for the cooling medium a flow path between the first accommodation cavity 1113 and the first cooling flow channel 11311. In some embodiments, the cooling medium in the first accommodation cavity 1113 may enter the first cooling flow channel 11311 through the flow guide channel 1311. In other embodiments, the cooling medium in the first cooling flow channel 11311 may enter the first accommodation cavity 1113 through the flow guide channel 1311.

With the above-mentioned technical solution, a flow of the cooling medium between the first accommodation cavity 1113 and the first cooling flow channel 11311 can be effectively realized. Therefore, the stator 112 and the rotor 113 can be cooled.

In some embodiments of this application, referring to FIG. 12, the flow guide member 131 includes a flow guide body 1312 and an inserter 1313 connected to the flow guide body 1312. The flow guide channel 1311 penetrates the flow guide body 1312 and the inserter 1313. The inserter 1313 is inserted into the first cooling flow channel 11311.

The flow guide body 1312 is a main part of the flow guide member 131, and may be connected to other members to fix the flow guide member 131. Optionally, the flow guide body 1312 may have, but is not limited to having, a round disk shape, a square disk shape, a cylindrical shape, a prismatic shape, or the like. This is not specifically limited herein.

The inserter 1313 is a member connected within the first cooling flow channel 11311. Optionally, the inserter 1313 may have, but is not limited to having, a tubular structure, a table structure, or the like. This is not specifically limited herein.

In some embodiments, the flow guide body 1312 and the inserter 1313 are in no contact with the rotor shaft 1131 or another rotating structure connected to the rotor shaft 1131. Therefore, the flow guide member 131 can be prevented from rotating with the rotor shaft 1131.

In some embodiments, the flow guide body 1312 and the inserter 1313 may be of an integrally molded structure. For example, the flow guide body 1312 and the inserter 1313 are integrally molded through an injection molding process. In other embodiments, the flow guide body 1312 and the inserter 1313 may also be molded separately and then connected to each other.

With the above-mentioned technical solution, the cooling medium can be effectively injected into the first cooling flow channel 11311. Therefore, reliability of cooling the rotor 113 of the motor 11 can be effectively improved.

Figure 13:
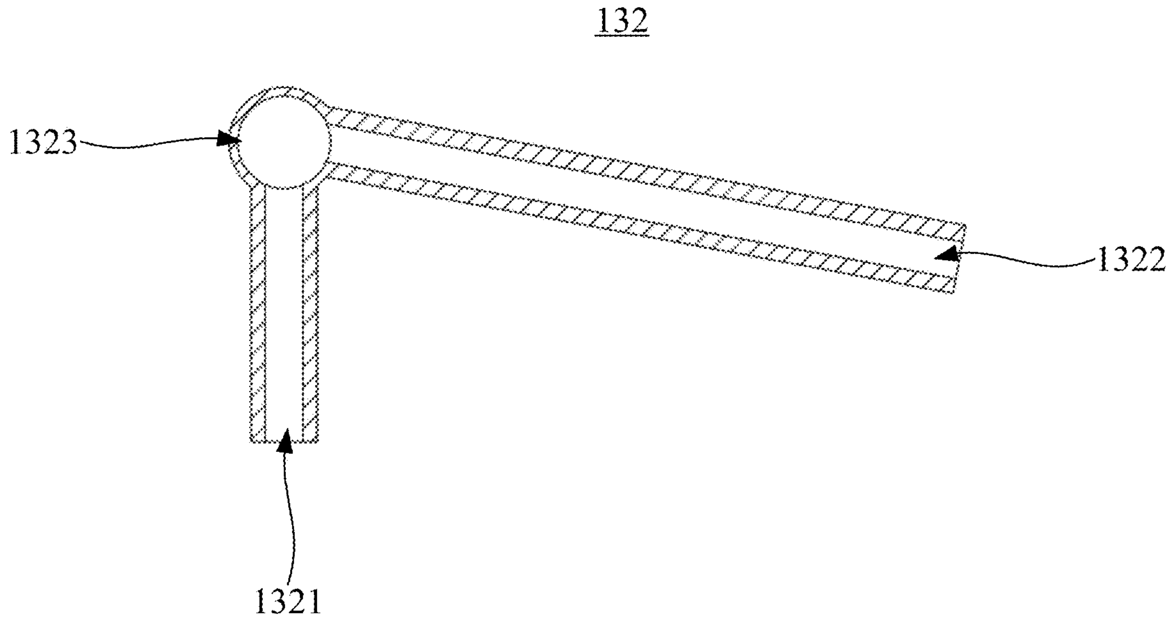
FIG. 13 is a schematic structural view of a flow diverter according to an embodiment of this application.

In some embodiments of this application, also referring to FIG. 11 and FIG. 13, the electric drive device 10 further includes the variable speed mechanism 14. The flow guide mechanism 13 further includes a flow diverter 132. The flow diverter 132 has a first flow diversion channel 1321 and a second flow diversion channel 1322. An end of the first flow diversion channel 1321 and an end of the second flow diversion channel 1322 are in communication with the first accommodation cavity 1113. Another end of the first flow diversion channel 1321 is in communication with the flow guide channel 1311. Another end of the second flow diversion channel 1322 is in communication with the variable speed mechanism 14.

The flow diverter 132 is a component configured to communicate the flow guide channel 1311 and the variable speed mechanism 14 with the first accommodation cavity 1113. The first flow diversion channel 1321 is configured to provide for the cooling medium a flow path between the first accommodation cavity 1113 and the flow guide channel 1311. The second flow diversion channel 1322 is configured to provide for the cooling medium a flow path between the first accommodation cavity 1113 and the variable speed mechanism 14.

In some embodiments, referring to FIG. 13, the flow diverter 132 further has a flow collection channel 1323 in communication with the first accommodation cavity 1113. An end of the first flow diversion channel 1321 and an end of the second flow diversion channel 1322 are in communication with the flow collection channel 1323. Another end of the first flow diversion channel 1321 is in communication with the flow guide channel 1311. Another end of the second flow diversion channel 1322 is in communication with the variable speed mechanism 14.

The variable speed mechanism 14 is configured to transfer the above-mentioned mechanical energy to the wheel of the vehicle 1000 through varying the rotational speed and the torque of the motor 11. For example, the above-mentioned mechanical energy is transferred to the wheel of the vehicle 1000 by the variable speed mechanism 14 through reducing the rotational speed of the motor 11 and increasing the torque of the motor 11. For another example, the above-mentioned mechanical energy is transferred to the wheel of the vehicle 1000 by the variable speed mechanism 14 through increasing the rotational speed of the motor 11 and reducing the torque of the motor 11. Optionally, the variable speed mechanism 14 may be, but is not limited to, a gear shaft variable speed mechanism 14, a worm gear variable speed mechanism 14, a planetary gear variable speed mechanism 14, a continuously variable speed mechanism 14, or the like. This is not specifically limited herein.

With the above-mentioned technical solution, the cooling medium discharged from the first accommodation cavity 1113 can not only flow into the first cooling flow channel 11311 to cool the rotor 113, but also flow into the variable speed mechanism 14 to cool and lubricate members in the variable speed mechanism 14. Therefore, the cooling medium can be fully utilized, which is conducive to improving the operation performance of the electric drive device 10.

An operation principle of an embodiment of the above-mentioned flow guide mechanism 13 is explained below.

Referring to FIG. 11, the cooling medium in the first accommodation cavity 1113 flows into the flow collection channel 1323 of the flow diverter 132. Part of the cooling medium in the flow collection channel 1323 flows into the first flow diversion channel 1321 and enters the flow guide channel 1311 of the flow guide member 131 along the first flow diversion channel 1321. Then, this part of the cooling medium in the flow collection channel 1323 flows into the first cooling flow channel 11311 of the flow guide member 131 along the flow guide channel 1311 to cool the rotor 113. Another part of the cooling medium in the flow collection channel 1323 flows into the second flow diversion channel 1322 and flows along the second flow diversion channel 1322 into a corresponding part of the variable speed mechanism 14, for cooling and lubricating the corresponding part of the variable speed mechanism 14.

In some embodiments of this application, referring to FIG. 14, the casing 111 is provided with a first bearing seat 11116. The first cooling flow channel 11311 is in communication with the first bearing seat 11116.

The first bearing seat 11116 is configured to provide a mounting space for the rotary shaft. For example, the rotary shaft in the variable speed mechanism 14 of the electric drive device 10 is mounted at the first bearing seat 11116. It should be understood that, when the casing 111 includes the outer casing 1111 and the inner casing 1112, the first bearing seat 11116 is disposed at the outer casing 1111.

The first cooling flow channel 11311 is in communication with the first bearing seat 11116, which means that the cooling medium in the first cooling flow channel 11311 can enter an internal space of the first bearing seat 11116 through a necessary communication structure.

With the above-mentioned technical solution, the cooling medium discharged from the first cooling flow channel 11311 can flow into the first bearing seat 11116 to cool and lubricate members in the first bearing seat 11116. Therefore, the cooling medium can be fully utilized, which is conducive to improving the operation performance of the electric drive device 10.

In some embodiments of this application, referring to FIG. 14, the casing 111 is provided with a flow guide passage 11117. The flow guide passage 11117 has an end in communication with the first cooling flow channel 11311 and another end in communication with the first bearing seat 11116.

The flow guide passage 11117 is a communication structure for communicating the first cooling flow channel 11311 with the first bearing seat 11116. In some embodiments, the flow guide passage 11117 may be a flow guide rib disposed at the casing 111. The flow guide rib has an end in communication with the first cooling flow channel 11311 and another end connected to the first bearing seat 11116. In other embodiments, the flow guide passage 11117 may be a flow guide tube disposed at the casing 111. The flow guide tube has an end in communication with the first cooling flow channel 11311 and another end connected to the first bearing seat 11116.

With the above-mentioned technical solution, the first cooling flow channel 11311 can effectively communicate with the first bearing seat 11116, and a structure of the motor 11 is made compact. Therefore, the volume of the electric drive device 10 can be effectively reduced.

In some embodiments of this application, the electric drive device 10 further includes the variable speed mechanism 14. The variable speed mechanism 14 includes a rotary shaft rotatably mounted at the first bearing seat 11116.

The rotary shaft may be any one of the rotary shafts in the variable speed mechanism 14, for example, a power input shaft, a power output shaft, or the like. This is not specifically limited herein.

With the above-mentioned technical solution, the rotary shaft of the variable speed mechanism 14 can be effectively cooled and lubricated.

In some embodiments of this application, the rotary shaft is a power output shaft.

The power output shaft is a shaft configured to be connected to the vehicle 1000 of the vehicle 1000.

In some embodiments, the casing 111 is further provided with a second bearing seat 11118. The rotor shaft 1131 is rotatably mounted at the second bearing seat 11118. A power input shaft of the variable speed mechanism 14 is rotatably mounted at the second bearing seat 11118 and coaxially connected to the rotor shaft 1131. The power input shaft has a third cooling flow channel. The first cooling flow channel 11311 is in communication with the third cooling flow channel. The second bearing seat 11118 has an opening in communication with the third cooling flow channel. An end of the flow guide passage 11117 away from the first bearing seat 11116 is connected to the opening. The cooling medium in the first cooling flow channel 11311 flows into the first bearing seat 11116 through the third cooling flow channel, the opening, and the flow guide passage 11117 sequentially.

With the above-mentioned technical solution, the power output shaft of the variable speed mechanism 14 can be effectively cooled and lubricated.

A cooling principle of the electric drive device 10 according to this embodiment is explained below.

Referring to FIG. 11, the cooling medium is provided in the cooling medium container 300. The power pump 121 is configured to draw the cooling medium from the cooling medium container 300, in such a manner that the cooling medium flows through the filter 123, the heat exchanger 122, and the one-way valve 125 sequentially, and then enters the first accommodation cavity 1113 through the cooling medium inlet 1118. The heat generated by the stator 112 is absorbed by the cooling medium in the first accommodation cavity 1113. The cooling medium leaves the first accommodation cavity 1113 from the cooling medium outlet 1119 and enters the flow collection channel 1323 of the flow diverter 132. Part of the cooling medium in the flow collection channel 1323 flows into the first flow diversion channel 1321 and enters the flow guide channel 1311 of the flow guide member 131 along the first flow diversion channel 1321. Then, this part of the cooling medium in the flow collection channel 1323 flows into the first cooling flow channel 11311 of the flow guide member 131 along the flow guide channel 1311 to cool the rotor 113. Another part of the cooling medium in the flow collection channel 1323 flows into the second flow diversion channel 1322 and flows along the second flow diversion channel 1322 into a corresponding part of the variable speed mechanism 14, for cooling and lubricating the corresponding part of the variable speed mechanism 14. During cooling the rotor 113, part of the cooling medium in the first cooling flow channel 11311 flows through the first through hole 11312, the second cooling flow channel 11321, the second accommodation cavity 1114, and the second through hole 11141 sequentially, and finally flows back into the cooling medium container 300. Another part of the cooling medium in the first cooling flow channel 11311 flows sequentially through the opening of the second bearing seat 11118 and the flow guide passage 11117 into the first bearing seat 11116 to cool and lubricate the power output shaft of the variable speed mechanism 14, and finally flows back into the cooling medium container 300.

The embodiments of this application further provide an electric drive system 100. The electric drive system 100 includes a battery 20 and the electric drive device 10 according to any of the above-mentioned embodiments. The battery 20 is electrically connected to the electric drive device 10.

Since the electric drive device 10 according to any of the above-mentioned embodiments is adopted by the electric drive system 100 provided by the embodiments of this application, a cooling efficiency of the electric drive system 100 can be effectively improved, which is conducive to improving operation performance of the electric drive system 100.

The embodiments of this application further provide an electric apparatus including the above-mentioned electric drive system 100.

Since the electric drive system 100 according to any of the above-mentioned embodiments is adopted by the electric apparatus provided by the embodiments of this application, a cooling efficiency of the electric apparatus is effectively improved, which is conducive to improving operation performance of the electric apparatus.

While some embodiments of this application have been described above, this application is not limited to these embodiments. Any modification, equivalent substitution, improvement, and the like made within the ideas and principles of this application shall fall within the protection scope of this application.

What is claimed is:

1. A motor comprising a casing provided with a first accommodation cavity inside, wherein the first accommodation cavity is configured to accommodate a cooling medium; and a stator disposed in the first accommodation cavity, at least part of the stator being immersed in the cooling medium;

wherein the motor further comprises a rotor, a second accommodation cavity spaced apart from the first accommodation cavity is further provided inside the casing, and the rotor is disposed within the second accommodation cavity;

wherein the rotor comprises a rotor shaft and a rotor disk connected to the rotor shaft, the rotor shaft internally having a first cooling flow channel, and the first cooling flow channel being in communication with the first accommodation cavity; and wherein the rotor disk internally has a second cooling flow channel, the second cooling flow channel having an end in communication with the first cooling flow channel and another end in communication with the second accommodation cavity.

2. The motor according to claim 1, wherein an end of the second cooling flow channel away from the first cooling flow channel penetrates an end face of the rotor disk to be in communication with the second accommodation cavity, optionally the end of the second cooling flow channel away from the first cooling flow channel penetrates two opposite end faces of the rotor disk.

3. The motor according to claim 1, wherein a plurality of second cooling flow channels are provided, and the plurality of second cooling flow channels are arranged around the rotor shaft.

4. The motor according to claim 1, wherein a wall body of the rotor shaft has a first through hole, the second cooling flow channel being in communication with the first cooling flow channel through the first through hole.

5. The motor according to claim 4, wherein a cavity wall of the second accommodation cavity is provided with a second through hole.

6. A motor comprising a casing provided with a first accommodation cavity inside, wherein the first accommodation cavity is configured to accommodate a cooling medium; and a stator disposed in the first accommodation cavity, at least part of the stator being immersed in the cooling medium; wherein the first accommodation cavity comprises a first cavity body and a second cavity body; the stator comprises a first stator disposed in the first cavity body and a second stator disposed in the second cavity body; and the second accommodation cavity is formed between the first cavity body and the second cavity body and wherein the casing comprises an outer casing, an inner casing, a first sealing assembly, and a second sealing assembly, the inner casing comprising a first portion, a second portion, and a third portion disposed between the first portion and the second portion, wherein the first cavity body is defined by the first portion, the first sealing assembly, and the outer casing, and wherein the second cavity body is defined by the second portion, the second sealing assembly, and the outer casing.

7. The motor according to claim 6, wherein the outer casing comprises a first inner annular wall and a first outer annular wall surrounding the first inner annular wall; the first sealing assembly comprises a first sealing member disposed between the first outer annular wall and a side of the third portion in an axial direction of the motor; and the second sealing assembly comprises a third sealing member disposed between the first outer annular wall and another side of the third portion in the axial direction of the motor.

8. The motor according to claim 6, wherein the second accommodation cavity comprises a third cavity body and a fourth cavity body; the rotor comprises a first rotor disposed in the third cavity body and a second rotor disposed in the fourth cavity body; and the first accommodation cavity is formed between the third cavity body and the fourth cavity body.

9. The motor according to claim 8, wherein the third cavity body is formed in the first portion, or wherein the third cavity body is defined by the first portion, the first sealing assembly, and the outer casing.

10. The motor according to claim 8, wherein the fourth cavity body is formed in the second portion, or wherein the fourth cavity body is defined by the second portion, the second sealing assembly, and the outer casing.

11. A motor comprising a casing provided with a first accommodation cavity inside, wherein the first accommodation cavity is configured to accommodate a cooling medium; and a stator disposed in the first accommodation cavity, at least part of the stator being immersed in the cooling medium;

wherein the motor further comprises a rotor, a second accommodation cavity spaced apart from the first accommodation cavity is further provided inside the casing, and the rotor is disposed within the second accommodation cavity; and wherein the casing comprises an outer casing and an inner casing disposed in the outer casing, the first accommodation cavity and the second accommodation cavity being formed in the inner casing.

12. A motor comprising a casing provided with a first accommodation cavity inside, wherein the first accommodation cavity is configured to accommodate a cooling medium; and a stator disposed in the first accommodation cavity, at least part of the stator being immersed in the cooling medium;

wherein the casing has a cooling medium inlet and a cooling medium outlet that are respectively in communication with the first accommodation cavity, the cooling medium inlet comprising a first inlet located at an inner peripheral side of the stator, and the cooling medium outlet being located at an outer peripheral side of the stator;

wherein the motor further comprises a rotor, wherein the casing further is further provided with a second accommodation cavity spaced apart from the first accommodation cavity inside, the rotor being disposed in the second accommodation cavity; the first accommodation cavity comprises a first cavity body and a second cavity body; the stator comprises a first stator disposed in the first cavity body and a second stator disposed in the second cavity body; and the second accommodation cavity is formed between the first cavity body and the second cavity body; and wherein a plurality of first inlets are provided, at least one of the plurality of first inlets being located at a side of the first stator facing away from the rotor and in communication with the first cavity body, and at least one of the remaining of the plurality of first inlets being located at a side of the second stator facing away from the rotor and in communication with the second cavity body.

13. The motor according to claim 1, wherein the casing has a cooling medium inlet and a cooling medium outlet that are respectively in communication with the first accommodation cavity, the cooling medium inlet being located at a height smaller than a height of the cooling medium outlet.

14. An electric drive device comprising a liquid supply mechanism; and the motor according to claim 1, wherein the liquid supply mechanism is in communication with the first accommodation cavity to deliver the cooling medium into the first accommodation cavity.

* * * * *